United States Patent
Kobayashi et al.

(10) Patent No.: US 10,444,540 B2
(45) Date of Patent: Oct. 15, 2019

(54) CONTACT LENS MANUFACTURING METHOD AND CONTACT LENS

(71) Applicant: MENICON CO., LTD., Nagoya-shi, Aichi (JP)

(72) Inventors: Atsushi Kobayashi, Kasugai (JP); Hiroaki Suzuki, Kasugai (JP)

(73) Assignee: MENICON CO., LTD., Nagoya (JP)

( * ) Notice: Subject to any disclaimer, the term of this patent is extended or adjusted under 35 U.S.C. 154(b) by 0 days.

(21) Appl. No.: 16/034,723

(22) Filed: Jul. 13, 2018

(65) Prior Publication Data
US 2018/0335646 A1    Nov. 22, 2018

Related U.S. Application Data

(62) Division of application No. 15/323,334, filed as application No. PCT/JP2014/068838 on Jul. 15, 2014, now Pat. No. 10,281,740.

(51) Int. Cl.
*G02C 7/02* (2006.01)
*G02C 7/04* (2006.01)

(52) U.S. Cl.
CPC ............. *G02C 7/028* (2013.01); *G02C 7/027* (2013.01); *G02C 7/047* (2013.01); *G02C 7/049* (2013.01)

(58) Field of Classification Search
CPC . G02C 7/02; G02C 7/04; G02C 7/028; G02C 7/049; G02C 7/027; G02C 7/047;
(Continued)

(56) References Cited

U.S. PATENT DOCUMENTS 6,241,355 B1    6/2001    Barsky
2004/0156013 A1    8/2004    Lindacher et al.
(Continued)

FOREIGN PATENT DOCUMENTS

JP    2004-534964 A    11/2004
JP    2006-515938 A    6/2006
(Continued)

OTHER PUBLICATIONS

Oct. 28, 2014 International Search Report issued in International Patent Application No. PCT/JP2014/068838.
(Continued)

*Primary Examiner* — Jie Lei
(74) *Attorney, Agent, or Firm* — Oliff PLC

(57) ABSTRACT

The purpose of the present invention is to provide novel contact lens manufacturing method and contact lens capable of giving a lens inner surface shape reflecting a cornea shape of a contact lens wearer more easily than before with sufficient accuracy to reflect the cornea shape, thereby improving comfort during use. By using statistical information on a corneal surface shape obtained from a population of target eyes having a feature to be treated, a fitting for a rotationally-symmetric shape is performed based on a definitional equation using a radius of curvature (R) and a conic constant (C.C.) while a fitting for a rotationally-asymmetric shape is performed based on a definitional equation using a Zernike function. A shape of a lens rear surface (20) corresponding to the corneal surface shape specified by these definitional equations is adopted for a rear surface of a peripheral area of a contact lens (10).

8 Claims, 7 Drawing Sheets
(4 of 7 Drawing Sheet(s) Filed in Color)

(58) Field of Classification Search
CPC ......... G02C 5/00; A61B 3/125; A61B 3/1015;
A61B 3/107
USPC ...... 351/159.74, 159.76, 178, 219, 247, 246
See application file for complete search history.

(56) References Cited

U.S. PATENT DOCUMENTS

| | | |
|---|---|---|
| 2004/0246440 A1 | 12/2004 | Andino et al. |
| 2006/0274262 A1 | 12/2006 | Andino et al. |
| 2008/0013043 A1 | 1/2008 | Ye et al. |
| 2012/0143326 A1 | 6/2012 | Canovas Vidal et al. |

FOREIGN PATENT DOCUMENTS

| | | |
|---|---|---|
| JP | 2009-244637 A | 10/2009 |
| JP | 2009-544059 A | 12/2009 |

OTHER PUBLICATIONS

Jan. 30, 2018 Search Report issued in European Patent Application No. 14897699.6.
Aug. 31, 2018 Office Action issued in U.S. Appl. No. 15/323,334.

CONTACT LENS MANUFACTURING METHOD AND CONTACT LENS

This is a Division of application Ser. No. 15/323,334 filed Dec. 30, 2016, which in turn is a National Phase of International Patent Application No. PCT/JP2014/068838 filed Jul. 15, 2014. The disclosures of the prior applications are hereby incorporated by reference herein in their entireties.

TECHNICAL FIELD

The present invention relates to a contact lens manufacturing method and contact lens, and particularly to a novel contact lens manufacturing method and contact lens that provide a specific structure to the lens rear surface to be overlapped on the human eye.

BACKGROUND ART

From the past, various types of soft type and hard type contact lenses have been provided with the object of correcting myopia, hyperopia, astigmatism, presbyopia or the like.

Meanwhile, this kind of contact lens is worn overlapping the surface of the cornea, which is a sensitive biological tissue. Therefore, in addition to optical characteristics adapted for the wearer, it is required for the contact lenses to suppress the sense of a foreign object when worn and to realize a wearing comfort.

Also, to realize a wearing comfort with reduced irritation on the cornea, when fitting a contact lens on each person, a radius of curvature corresponding to the cornea of the wearer is selected among a plurality of base curves set for the lens rear surface. For example, with many of the disposable type soft contact lenses on the market, there is a base curve setting standard of every 0.1 mm within a range of 8.5 mm to 9.0 mm.

However, there are individual differences in corneal surface shape, and with base curves of that kind of standard, there were cases when it was difficult to obtain a sufficiently satisfactory wearing comfort. Particularly with hard contact lenses, even if the shape difference between the lens rear surface and the corneal surface is small, the pressing sensation is strong, and it is easy for the wearing sensation to be a problem. Also, with soft contact lenses, if the difference between the lens rear surface and the corneal surface is big, there is a risk of the lens displacement volume on the cornea when worn becoming big, resulting in a decrease in vision.

Rather than simply selecting a base curve of the contact lens, to realize a high level of shape fitting of the contact lens rear surface on the corneal surface, PCT Japanese Translation Patent Publication No. JP-A-2004-534964 (Patent Document 1) proposes manufacturing a made-to-order contact lens for which the cornea shape is actually measured for each individual, and a shape corresponding to the actual measurement results is noted mathematically so as to be reflected in the lens rear surface shape.

However, when manufacturing the made-to-order contact lenses as noted in Patent Document 1, the contact lenses must be designed and produced using a lens rear surface shape for which the corneal surface shape for each lens user (wearer) is measured individually, and furthermore, the measurement results are faithfully reflected. Therefore, a vast amount of labor, time and cost is required, making it very difficult to put that to practical use.

In fact, it is difficult to represent actual measurements of the complex cornea shape using mathematical notation, and we at least have to say that the practicality is poor with the invention noted in Patent Document 1. Even if it is possible to mathematically represent the complex surface shape of the cornea, the mathematical notation is extremely complex, and when understanding the specific shape or doing processing, numerical value handling is difficult in regards to things such as to what level of precision processing should be done on which numerical values. Thus, it is difficult to reflect the mathematical notation to the lens inner surface shape to produce a contact lens, and the time, labor and technical burden required when producing the lens is extremely large. Also, when forming the surface shape represented by a complex mathematical notation on the actual lens rear surface, there is the problem that it is easy for the processing error to become large. In fact, even currently with approximately ten years elapsed since publication of Patent Document 1, contact lenses having the made-to-order lens rear surface like that noted in Patent Document 1 have not been provided to the market, so we can understand that it is difficult to put this to practical use.

BACKGROUND ART DOCUMENT

Patent Document

Patent Document 1: JP-A-2004-534964

SUMMARY OF THE INVENTION

Problem the Invention Attempts to Solve

The present invention has been developed in view of the above-described matters as the background, and it is an object of the present invention to provide novel contact lens manufacturing method and contact lens which are able to give a lens inner surface shape reflecting the cornea shape of the contact lens wearer more simply than in the past, and with a sufficiently high precision reflection of the cornea shape, thereby making it possible to improve the wearing comfort.

Means for Solving the Problem

A first mode of the present invention to address the problems provides a contact lens manufacturing method comprising: using statistical information of a corneal surface shape obtained by a population of target eyes having a feature that is a subject of prescription; performing a fitting of a rotationally symmetrical shape by setting values of a radius of curvature and a conic constant from the statistical information according to a formula below; specifying a corneal surface shape corresponding to the population of the target eyes by fitting a rotationally asymmetric element which is a residual difference during the fitting of the rotationally symmetrical shape using a Zernike surface; and using a lens rear surface shape corresponding to the corneal surface shape specified by the radius of curvature, the conic constant, and the Zernike surface for a rear surface of a peripheral area of the contact lens:

R value with $-2\sigma \leq R \leq R$ value with $+2\sigma$
C.C. value with $-2\sigma \leq C.C. \leq C.C.$ value with $+2\sigma$
Where,
R: Radius of curvature
C.C.: Conic constant
$\sigma$: Standard deviation.

In the state noted in the "Background Art" section above, for the cornea shape of the human eye that not only differs with each individual but is also too complex to be able to specify one model mathematically, as a result of cumulative research by the inventors, they discovered that it is effective to combine two basic technical concepts, and the present invention was completed based on that knowledge.

One of the two basic technical concepts is, "efficient utilization of statistical information," and the other is, "setting the lens rear surface shape by combining a rotationally symmetrical shape and a rotationally asymmetric shape."

Specifically, in regards to the former, "efficient utilization of statistical information," this uses the fact that the corneal surface shape of a human eye to be corrected by a contact lens or the like statistically has approximately normally distributed features. For example, it is well known that the corneal surface shape of the human eye is not a perfect spherical crown surface, and it is also a statistically known fact that there is a trend for the curvature distribution to differ at the nose side and the ear side. By using this kind of statistical information regarding the corneal surface shape, compared to the handling that is completely made-to-order as noted in Patent Document 1, this invention efficiently and realistically achieves practical utilization of technology reflecting the corneal surface shape of the wearer on the lens rear surface.

Also, regarding the corneal surface shape of the human eye, in addition to using all human eyes as the population, it is possible to improve the fitting precision of the corneal surface shape by using as the subject a population focused on a target in a range for which it is assumed there is sharing of the feature points of the corneal surface shape such as with the population specified by age, ethnic group or the like considering the human eye size, radius of curvature or the like. In specific terms, for example, it is possible to statistically focus on a target cornea surface shape by using statistical information obtained by the population of the target eyes while narrowing the target eyes according to things like myopia, hyperopia, presbyopia, conical cornea or the like according to cases subject to contact lens prescription, or the like. If it is possible to confirm features of the target eyes by analyzing statistical information or the like, this kind of narrowing down of the population can be used appropriately as necessary, thereby further improving fitting precision.

Next, with the latter, "setting the lens rear surface shape by combining a rotationally symmetrical shape and a rotationally asymmetric shape," fitting of the lens rear surface is performed for each individual by manufacturing a contact lens that is suited to each individual contained in a population by reflecting the cornea shape obtained from the statistical information of the former described above on the lens rear surface. At that time, with the present invention, a mathematical model of a rotationally symmetrical shape and a mathematical model of a rotationally asymmetric shape are combined and used, and a suitable adjustment method using the conic constant is used for the former, while a suitable adjustment method using a Zernike surface shape is used for the latter.

In particular, by combining and using these two types of mathematical models, even when fitting on a corneal surface having a rotationally asymmetric shape using a Zernike surface shape which is relatively complex, it is possible to simplify the Zernike surface shape while ensuring precision, making it possible to easily do suitable adjustment. Also, even if an error is included in the reflection of the corneal surface shape using a Zernike surface shape, for example, by reflecting the rotationally symmetrical shape of an asymmetrical surface using a conical coefficient, the occurrence of a large error due to the Zernike surface shape error is inhibited. Thus, by the mutually complementary action of the two types of mathematical models, there is stable quality when fitting using the mathematical model of the lens rear surface.

A second mode of the present invention provides the contact lens manufacturing method according to the first mode, wherein a Zernike polynomial specifying the Zernike surface is an item shown by Formula 1 below and includes at least Zernike terms where $i=0$ to 20.

$$W(\rho, \theta) = \sum_{i=o}^{\infty} N_i \, P_i \, Z_i \qquad \text{[Formula 1]}$$

Where,
  $W(\rho, \theta)$: Zernike surface
  $N_i$: i-th normalization coefficient
  $P_i$: i-th standard Zernike coefficient
  $Z_i$: i-th Zernike function According to this mode, by using a Zernike polynomial that includes the Zernike terms where $i=0$ to 20, the rotationally asymmetric element of the cornea surface shape is understood as a mathematical model having more sufficient precision, and can be reflected in the shape of the lens rear surface. With the Zernike polynomial, by using more Zernike terms, it is possible to more precisely understand the rotationally asymmetric elements of the cornea surface shape. In that case, preferably, in addition to the Zernike terms where $i=0$ to 20, all or selected items of the Zernike terms where $i=22$ to 26, 30 to 33, 39 to 41, 49 to 50, and 60 can be used.

A third mode of the present invention provides the contact lens manufacturing method according to the second mode, wherein the Zernike polynomial specifying the Zernike surface includes at least the Zernike terms where $i=0$ to 20, 22 to 26, 30 to 33, 39 to 41, 49 to 50, and 60. According to this mode, it is possible to even more precisely and efficiently understand the rotationally asymmetric elements of the cornea surface shape.

A fourth mode of the present invention provides the contact lens manufacturing method according to any of the first to third modes, wherein with the Zernike surface by which the rotationally asymmetric element in the population of the target eyes is fit, a value for fitting the rotationally asymmetric element with $\pm 0\sigma$ is used as a Zernike coefficient.

With this mode, for the Zernike coefficient of the Zernike surface that expresses the rotationally asymmetric element with the statistical information of the corneal surface shape of the population, by using the value of $\pm 0\sigma$ obtained from that statistical information, it is possible to efficiently capture the features of the rotationally asymmetric element of the corneal surface shape of the population using one average Zernike surface, and to reflect that on the lens rear surface shape.

A fifth mode of the present invention provides the contact lens manufacturing method according to any of the first to fourth modes, wherein the fitting of the rotationally symmetrical shape is performed using Formula 2 below.

$$Z = \frac{\frac{x^2 + y^2}{R}}{1 + \sqrt{1 - \frac{(1 + C.C.) \cdot (x^2 + y^2)}{R^2}}} \qquad \text{[Formula 2]}$$

Where,
- R: Radius of curvature of a vertex
- C.C.: Conic constant

With the first mode of the present invention, as an aspherical shape definitional equation that can specify the rotationally symmetrical shape using the radius of curvature and the conic constant, it is possible to use any of the known items. For example, when using the Z axis for the optical axis direction, and the X axis and Y axis for directions orthogonal to that, while the aspherical surface is defined by the body of rotation around the Z axis with the Y axis as the lens radial direction coordinate, as the formula of the curved line within the YZ plane, it is possible to use an even function comprising an even-number order power series polynomial so as to have the same value for the +x side and the −x side. Here, with this mode, by using Formula 2 noted above, by omitting high order aspherical shapes of fourth order and greater, while using a relatively simple rotary quadric surface, it is possible to obtain a mathematical model that reflects the rotationally symmetrical shape of the corneal surface which is an aspherical surface efficiently and with sufficient precision using the radius of curvature and the conic constant.

With the curve equation on the YZ plane expressed by Formula 2 that defines the rotationally symmetrical aspherical shape, the radius of curvature R expresses the radius of curvature with the vertex of the aspherical surface that is on the Z axis, and the Z coordinate value correlates to the lens sag volume. Also, $(x^2+y^2)$ can also be understood as the distance from the vertex of the aspherical surface which is the coordinate origin point to each point on the curve. Also, with Formula 2, the value of conic constant C.C. is C.C.$\neq$0 because it is an aspherical surface, when C.C.=−1, Formula 2 represents a parabola, and when C.C.<−1, Formula 2 represents a hyperbola, when −1<C.C.<0, Formula 2 represents an elliptical line with the Z axis direction as the major axis, and when C.C.>0, Formula 2 represents an elliptical line with the Z axis direction as the minor axis.

A sixth mode of the present invention provides the contact lens manufacturing method according to any of the first to fifth modes, wherein the feature that is the subject of prescription with the target eyes is myopia.

With this mode, for myopic eyes for which there is typically great demand and a tendency for features to appear in the cornea shape due to growth of the ocular axis length and the like, by applying the method of the present invention, it is possible to efficiently provide contact lenses equipped with a lens rear surface to match the surface shape of the cornea, and by making this practical, it is possible for many people in society to enjoy those benefits.

For the population that is subject to the method of the present invention noted in the first mode and the like, in addition to cases such as myopia, hyperopia and the like as described previously, it is also possible to suitably set the population classified by things such as ethnic type, age, gender, body type and the like. Also, in addition to acquiring statistical information by an exhaustive survey of the population, it is also possible to acquire statistical information of the population by doing a sample survey using extracted samples. Also, when doing sample extraction, the number of samples needed can be set considering things such as the required error or reliability, level of dispersion or the like based on the statistical method.

A seventh mode of the present invention provides the contact lens manufacturing method according to the sixth mode that applies the present invention with myopic eyes as the subject, wherein the value of the radius of curvature and the value of the conic constant are set within a range of a formula below, and as a Zernike polynomial for specifying the Zernike surface, an item is used that contains terms of the following standard Zernike coefficient values.

−5.909 mm$\leq$R$\leq$−6.701 mm
−1.550$\leq$C.C.$\leq$−1.885
$P_0=-9.6845\times10^{-4}$
$P_1=8.9965\times10^{-6}$
$P_2=-0.0011180$
$P_3=-1.3770\times10^{-4}$
$P_4=0.0052355$
$P_5=3.8193\times10^{-4}$
$P_6=7.6195\times10^{-6}$
$P_7=-4.4347\times10^{-6}$
$P_8=2.5460\times10^{-5}$
$P_9=-3.2957\times10^{-6}$
$P_{10}=9.3233\times10^{-7}$
$P_{11}=-1.1110\times10^{-6}$
$P_{12}=-8.9217\times10^{-5}$
$P_{13}=-4.9545\times10^{-6}$
$P_{14}=3.9033\times10^{-7}$
$P_{15}=4.1580\times10^{-9}$
$P_{16}=-9.6441\times10^{-8}$
$P_{17}=1.5186\times10^{-7}$
$P_{18}=4.4563\times10^{-7}$
$P_{19}=-1.5916\times10^{-8}$
$P_{20}=-1.1687\times10^{-8}$
$P_{22}=-6.8005\times10^{-10}$
$P_{23}=6.2657\times10^{-9}$
$P_{24}=-4.8416\times10^{-7}$
$P_{25}=2.0883\times10^{-8}$
$P_{26}=-1.4009\times10^{-9}$
$P_{30}=1.7202\times10^{-10}$
$P_{31}=-4.5331\times10^{-10}$
$P_{32}=-2.8146\times10^{-9}$
$P_{33}=9.2066\times10^{11}$
$P_{39}=-9.3203\times10^{-12}$
$P_{40}=-1.0670\times10^{-9}$
$P_{41}=-2.7720\times10^{-11}$
$P_{49}=4.1354\times10^{-13}$
$P_{50}=3.7438\times10^{-12}$
$P_{60}=8.3784\times10^{-13}$ According to this mode, the target eye population is the category classified as standard myopic eyes excluding special cases such as a special disease, heredity, or very strong myopia or the like, and the cornea surface shape assumed to be subject to prescription is narrowed. In addition, by using statistical information obtained in advance by the inventors, it is possible to provide on the market efficiently manufactured contact lenses equipped with a lens rear surface shape matched with good precision to the cornea surface shape of the eye subject to prescription. Also, by so doing, it is possible to easily perform individual fitting processing on wearers at the eye doctors or the like.

An eighth mode of the present invention provides the contact lens manufacturing method according to any of the first to seventh modes, wherein the contact lens is a hard type contact lens.

With this mode, with hard type contact lenses for which it is easy for the difference with the cornea surface shape to have an adverse effect on the wearing sensation, by applying the method of the present invention, it becomes possible to efficiently set the lens rear surface reflecting the cornea surface shape with good precision. As a result, it is possible to increase the practicality of providing hard contact lenses with excellent wearing comfort to the market.

A ninth mode of the present invention provides the contact lens manufacturing method according to any of the first to eighth modes, wherein within a region of the contact lens further to an outer circumference side than ø7 mm and further to an inner circumference side than 1 mm from an inside of an edge part, the peripheral area is provided using the lens rear surface shape corresponding to the corneal surface shape specified by the radius of curvature, the conic constant, and the Zernike surface.

The typical contact lens is equipped with an optical zone of the lens center part for which optical characteristics are set such as correction or the like which is the light ray transmitting region of the eye optical system, and a peripheral zone that surrounds the periphery of the optical zone and stably sets the lens position on the cornea. In addition, at the lens outer circumference edge part, provided is an edge part having a surface shape that connects the lens front face and rear face. Here, the peripheral zone is typically worn overlapping the corneal surface to hold the lens on a designated position on the cornea or the like. Therefore, with respect to the lens rear surface positioned roughly at the peripheral zone, by setting the peripheral area for which the shape has been set reflecting the cornea shape according to this mode, it is possible to even more effectively improve the lens wearing comfort.

The "peripheral area" having the lens rear surface in which the cornea shape is reflected according to this mode does not have to be set to match the peripheral zone of the contact lens. In particular, the peripheral area does not have to be provided along the entire region "between ø7 mm and a distance of 1 mm from the inside of the edge part," and it is acceptable as long as the peripheral area is provided on at least a portion of that region in the radial direction. Also, the peripheral area may be provided going past the region "between ø7 mm and a distance of 1 mm from the inside of the edge part" to the inner circumference side or to the outer circumference side.

Naturally, with the optical zone region, it is difficult to do design and manufacturing that reflects the cornea shape when giving the lens surface shape having the required optical characteristics. Thus, it is desirable to set the peripheral area avoiding the optical zone region, and more preferable to set the peripheral area in a region from or beyond ø6.0 mm. Also, the region of the inner circumference side of the peripheral area, particularly the optical zone region, without reflecting the cornea shape to a high degree on the lens rear surface, preferably has a slight separation of the lens rear surface from the corneal surface, so as to set a gap for which lacrimal fluid is filled between the lens rear surface and the corneal surface. This reduces the problem of worsening the wearing comfort by the lens rear surface of the optical zone or the like for which the corneal surface shape is not reflected being in contact with the cornea in the worn state. Yet further, the region of the outer peripheral side of the peripheral area also, without reflecting the cornea shape to a high degree on the lens rear surface, preferably has an edge lift set for which there is a gradually larger distance from the cornea toward the edge part of the lens outer circumference end. This makes it possible to have a benefit of the effect of promoting lacrimal fluid exchange between overlapping surfaces of the cornea and contact lens or the like.

A tenth mode of the present invention provides the contact lens manufacturing method according to any of the first to ninth modes, wherein the contact lens comprises an optical zone and a peripheral zone that surrounds an outer circumference of the optical zone, the peripheral zone includes the peripheral area that uses the lens rear surface shape corresponding to the corneal surface shape specified by the radius of curvature, the conic constant, and the Zernike surface, and the optical zone is configured to form a clearance between the optical zone and a cornea to be filled with lacrimal fluid.

According to this mode, with the optical zone, since contact with the corneal surface even in a worn state is reduced or avoided, it is possible to avoid a worsening of the wearing comfort even if the corneal surface shape is not reflected on the lens rear surface according to the method of the present invention. Meanwhile, with the peripheral zone, by giving the lens rear surface for which the corneal surface shape is reflected, it is possible to achieve a wearing comfort when overlapping on the corneal surface in the worn state.

The optical characteristics set for the optical zone are set as appropriate according to the eye optical system of the wearer, and for example it is possible to set as appropriate a spherical lens power, a cylindrical lens power, a multifocal lens power or the like that are well known from the past. Specifically, with the contact lens manufacturing method of any of the first to tenth modes as well, there is no limit to the optical characteristics that are set, and in particular it is possible to freely set the shape of the lens front surface. For example, it is also possible to use a lens thickness setting for circumference direction alignment using prism ballast, double thin or the like, through setting of the lens front surface shape or the like.

An eleventh mode of the present invention provides a contact lens including an optical zone and a peripheral zone provided around the optical zone, characterized in that with a lens rear surface of the peripheral zone, a peripheral area is set, the peripheral area comprising a rotationally asymmetric and non-toric shape surface included in a range of shape functions Za and Zb expressed by Formula 3 and Formula 4 below.

$$Za = \frac{\frac{x^2+y^2}{Ra}}{1+\sqrt{1-\frac{(1+C.C.a)\cdot(x^2+y^2)}{Ra^2}}} + \sum_{i=0}^{\infty} N_i P_i Z_i \quad \text{[Formula 3]}$$

$$Zb = \frac{\frac{x^2+y^2}{Rb}}{1+\sqrt{1-\frac{(1+C.C.b)\cdot(x^2+y^2)}{Rb^2}}} + \sum_{i=0}^{\infty} N_i P_i Z_i \quad \text{[Formula 4]}$$

Formula 3 and Formula 4 used with this mode are both mathematical expressions that more restrictively specify the lens rear surface defined using Formula 1 and Formula 2 noted previously. Also, in Formula 3 and Formula 4, Ra= −5.909 mm, C.C.a=−1.550, Rb=−6.701 mm, and C.C.b= −1.885. Furthermore, the second term at the right side of Formula 3 and Formula 4 is a Zernike polynomial, where Zi is the Zernike function, and as Pi, included are standard Zernike coefficients of each value of $P_0$ to $P_{20}$, $P_{22}$ to $P_{26}$, $P_{30}$ to $P_{33}$, $P_{39}$ to $P_{41}$, $P_{49}$ to $P_{50}$, and $P_{60}$ noted in the seventh mode noted above.

With the contact lens constituted according to this mode, the target eye population is the category classified as standard myopic eyes excluding special cases such as a special disease, heredity, or very strong myopia or the like. Based on statistical information obtained in advance by the inventors, contact lenses equipped with a lens rear surface shape matched with good precision to the cornea surface shape of the eye of the wearer are realized. In particular, with Formula 3 and Formula 4, the first term of the right side expressed by a quadratic term is a definitional equation of a quadratic curve within the YZ plane expressing a rotary quadric surface around the Z axis, and the second term of the right side expressed by the Σ term is a definitional equation comprising a polynomial including the Zernike function Zi expressing a free curve that is rotationally asymmetric and also not a toric shape.

As shown in these definitional equations, with the contact lens of this mode, by defining divided into a rotationally symmetrical aspherical shape and a rotationally asymmetric aspherical shape, it is possible to reflect the statistical information efficiently and with good precision. Then, with the coordinate origin point on the three orthogonal axes of X, Y, and Z as the lens vertex which becomes the optical axis intersection point, the aspherical shape positioned within the three dimensional space sandwiched between the curved surface defined by the shape function Za and the curved surface defined by the shape function Zb is set on the lens rear surface of the peripheral zone. This makes it possible to realize a lens rear surface with high conformity with the surface shape of the cornea, particularly of myopic eyes.

With this mode, the peripheral area comprising surfaces included within the range of shape functions Za and Zb does not have to be formed along the entire peripheral zone. For example, it is also possible to set the peripheral area to the specific radial direction parts of the peripheral zone for which it is easy to have a problem of contact with the cornea in particular. Also, it is also possible to set on the lens rear surface the aspherical shape positioned inside the three dimensional space sandwiched between the curved surface defined by the shape function Za and the curved surface defined by the shape function Zb up to the region which goes past the peripheral zone to the inner circumference side or to the outer circumference side.

Furthermore, with the contact lens constituted according to the eleventh mode of the present invention, it is possible to suitably use any of the twelfth to fifteenth modes described hereafter.

A twelfth mode of the present invention provides the contact lens according to the eleventh mode, wherein the contact lens is a hard type contact lens. With the contact lens constituted according to this mode, as explained with the eighth mode, it is possible to exhibit the technical effect of being able to realize a hard contact lens with excellent wearing comfort or the like.

A thirteenth mode of the present invention provides the contact lens according to the eleventh or twelfth mode, wherein a rear surface of the peripheral area provided with the rotationally asymmetric and non-toric shaped surface included within the range of the shape functions Za and Zb is set in a region of the contact lens further to an outer circumference side than ø7 mm and further to an inner circumference side than 1 mm from an inside of an edge part. With the contact lens constituted according to this mode, as explained with the ninth mode, the peripheral area for which a shape setting is implemented that reflects the cornea shape according to the present invention is provided on the lens rear surface of the region at which the wearing comfort is easily affected. Thus, it is possible to exhibit the technical effect of being able to even more effectively improve the lens wearing comfort.

A fourteenth mode of the present invention provides the contact lens according to any of the eleventh to thirteenth modes, wherein at a rear surface of the optical zone, a clearance forming surface is provided so as to cover a cornea with a gap therebetween. With the contact lens constituted according to this mode, as explained with the tenth mode, it is possible to exhibit the technical effects of being able to easily and effectively achieve both optical characteristics and wearing comfort.

A fifteenth mode of the present invention provides the contact lens according to any of the eleventh to fourteenth modes, wherein the rotationally asymmetric and non-toric shaped surface included within the range of the shape functions Za and Zb is set in an area region of 50% or greater of that of the rear surface of the contact lens. With the contact lens constituted according to this mode, by setting the lens rear surface that is overlapped having a shape corresponding to the corneal surface in the area region of 50% or greater, it is possible to exhibit technical effects such as being able to achieve positional stability in the contact lens worn state without being accompanied by a worsening of the wearing comfort. More preferably, the lens rear surface that is overlapped having a shape corresponding to the corneal surface is set in an area region of 60% or greater of the overall lens rear surface of the contact lens.

Effect of the Invention

According to the first mode of the present invention, by combining the technical concepts of "efficient utilization of statistical information" and "setting the lens rear surface shape by combining a rotationally symmetrical shape and a rotationally asymmetric shape," while suppressing large errors and the like, it is possible to efficiently match and reflect the corneal surface shape on the lens rear surface using a mathematical model. By so doing, the corneal surface shape of each wearer is sufficiently reflected at a practical use level, and it is possible to efficiently provide to each wearer a contact lens having lens rear surface precision and conformity.

Also, with the eleventh mode of the present invention, by the lens rear surface shape being set inside the three dimensional space defined by a specific shape function based on statistical information, it is possible to realize a contact lens having a lens rear surface with high conformance to the surface shape of a cornea, particularly of a myopic eye.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

EMBODIMENTS FOR CARRYING OUT THE INVENTION

Figure 1:
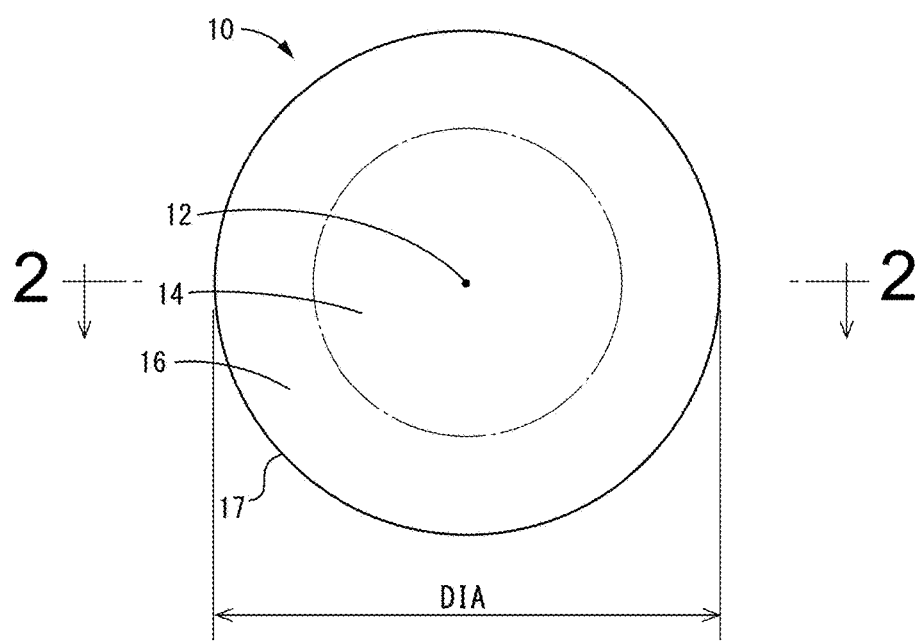
FIG. 1 is a front view showing an example of a contact lens manufactured according to the method of the present invention.

Following, we will describe embodiments of the present invention while referring to the drawings.

Figure 2:
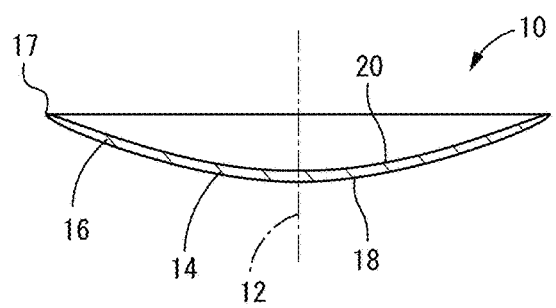
FIG. 2 is a cross section view taken along line 2-2 of FIG. 1.

First, FIG. 1 and FIG. 2 show the typical constitution of a contact lens 10 to which the present invention is applied. Specifically, the contact lens 10 has a thin, roughly spherical crown shape overall, and is made to be worn overlapping the surface of the cornea of an eyeball.

The contact lens 10 that is the subject of the present invention can be either a soft type contact lens or a hard type contact lens, can also be a hybrid type contact lens for which the center is hard and the periphery is soft, and can also be a disposable type contact lens for which a short usage limit is set such as one day or one week. No limitation is imposed as to the lens material. The lens outer diameter dimension (DIA) as well can be set in the same way as conventionally, so for example with the hard type, the DIA can be set in a range from 8.0 to 10.0 mm, and with the soft type in a range from 10.0 to 15.0 mm or the like.

Also, the contact lens 10 has a roughly circular shape for which a lens center axis 12 is the optical axis and the lens center axis 12 is used as the center with the front view (axial direction view) shown in FIG. 1. Furthermore, at the center region of the contact lens 10 containing the lens vertex which is the intersection point with the lens center axis 12, an optical zone 14 is formed for which a suitable lens power is set for vision correction. The optical zone 14 has a circular shape with the lens center axis 12 as the center in the front view (axial direction view) shown in FIG. 1. Also, with the contact lens 10, at an outer circumference region surrounding the optical zone 14 across the entire circumference, a roughly ring shaped peripheral zone 16 is formed. On a designated width region of the outer circumference side of the peripheral zone 16 it is also possible to give an edge lift on a lens rear surface 20. Also, on the outer circumference edge part of the peripheral zone 16, an edge part 17 that connects lens front and rear surfaces 18 and 20 is provided.

The optical zone 14 is a region that applies optical action on the optical system of the human eye in the worn state, and the boundary with the outer circumference edge part thereof, said another way the peripheral zone 16, typically can be thought of as the curvature change point on each vertical cross section at the lens front surface 18 positioned on the side opposite the cornea side and the lens rear surface 20 positioned at the cornea side. However, for example, there are also many cases when the lens surface of the optical zone 14 is designed in a vertical cross section shape such as one that gradually changes in the radial direction, or cases when the boundary is formed having a designated width in the radial direction and is formed by a connecting region or the like that smoothly connects the optical zone 14 and the peripheral zone 16 between the lens front surface 18 and the lens rear surface 20. Including those kinds of cases, the boundary of the optical zone 14 and the peripheral zone 16 with the lens front surface 18 and the lens rear surface 20 does not absolutely have to be clear as a line in terms of its shape.

Figure 3:
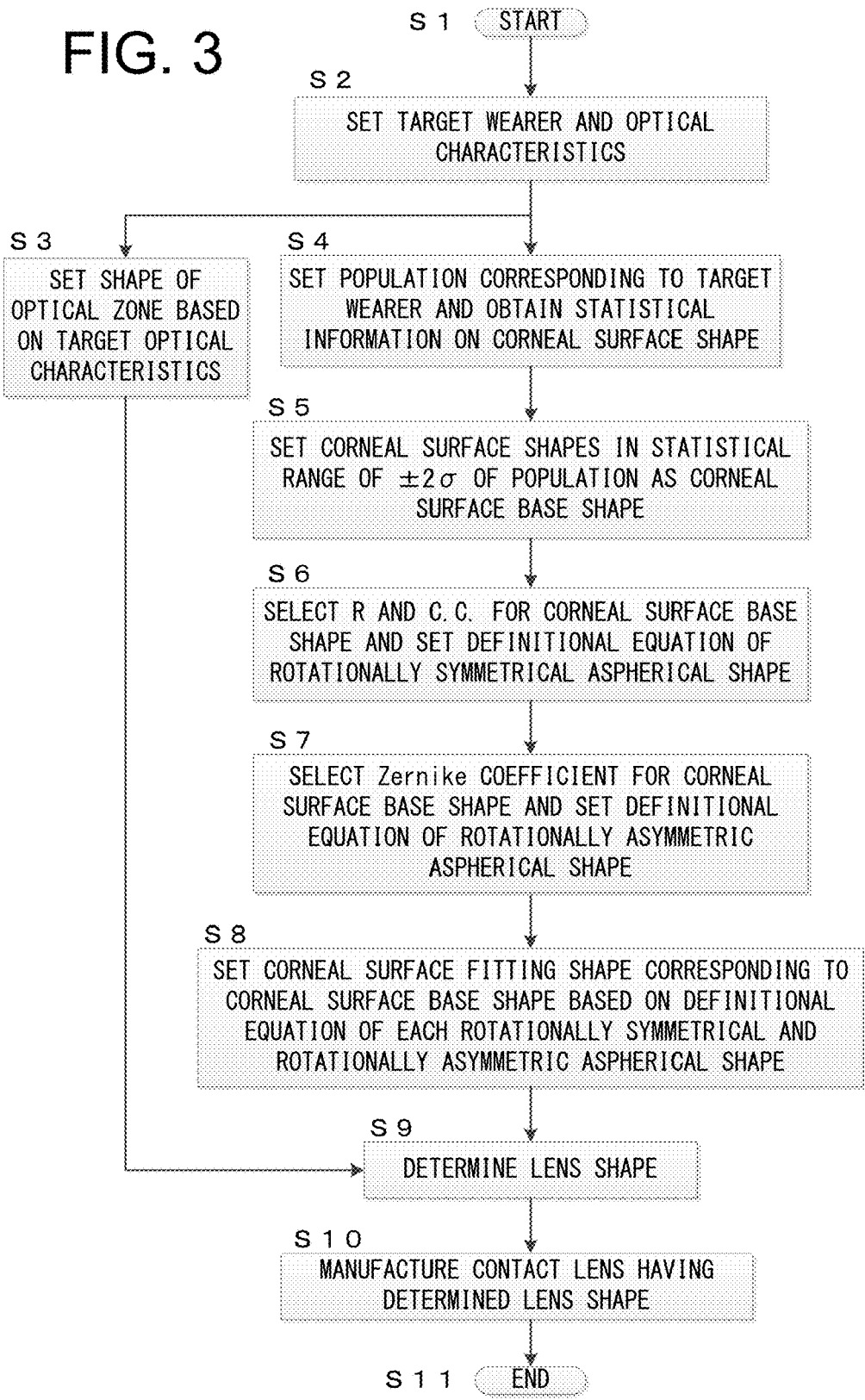
FIG. 3 is a flow chart showing an example of the manufacturing method according to the method of the present invention of the contact lens as shown in FIG. 1.

According to the present invention of this kind of contact lens 10, we will explain one specific mode of the method of manufacturing the contact lens 10 equipped with the lens rear surface 20 reflecting the surface shape of the cornea of the wearer who is the user of the contact lens, following the flow chart in FIG. 3.

First, after starting at step S1, at step S2, the optical characteristics are set for the wearer subject to prescription of the contact lens 10. In specific terms, for example, with an adult myopic user as the target wearer, optical characteristics for correcting myopia are set, or with an initial presbyopia user as the target wearer, optical characteristics for correcting initial presbyopia are set.

Then, at step S3, the shape of the optical zone 14 is set according to the optical characteristics set at step S2. In specific terms, the shape setting of the optical zone 14 can be performed using optical simulation software based on the ray tracing method, for example using ZEMAX (product name) or the like.

As with this mode, when producing a contact lens for correction of myopia with an adult standard myopic eye as the subject, the same as with conventional contact lenses for correction of myopia, in order to be able to provide to the market different levels of myopia correction power (Power), base curve (B.C.), and lens diameter (DIA) within respective assumed ranges, a plurality of types of optical zone 14 shapes are set. Then, the contact lens equipped with the optical zone 14 having each set shape is provided to the market in a set state as a series, and a selection can be made from within that series of the optimal contact lens to provide for each wearer.

Separate from this kind of optical zone 14 shape setting, at step S4, the population of target eyes having the features that are the subject of prescription are selected, and with that population as the subject, statistical information of the corneal surface shape is obtained. The features subject to prescription are set according to the users subject to provision of the contact lens 10, and for example it is possible to use a population of all human eyes, but more preferably, when providing contact lenses for correcting adult myopia, a population with adult myopia is selected, and when providing contact lenses for correction of presbyopia, a population of presbyopia is selected.

This is because there is a trend for statistical features to be seen in the corneal surface shape according to the difference in optical characteristics in this kind of eye optical system. Naturally, it is not essential to use differences in these kinds of optical characteristics as an index of population selection, and when it is necessary to place importance on the differences in the corneal surface shape with prescription subjects such as children or the elderly or the like, it is possible for a population to be selected with age conditions as the feature, or similarly for the population feature to be ethnic type or the like. It is also possible to select a population by combining a plurality of features.

With this kind of population as the subject, to obtain the corneal surface shape, it is also possible to directly measure the corneal surface shape optically without contact using a cornea shape measurement device available on the market such as an optical topographer (anterior eye part three dimensional optical coherence tomography, OCT) or ref/keratometer or the like. Alternatively, it is also possible to make a mold of the cornea surface, and by transferring that, to regenerate the corneal surface shape with a cast or the like, and to measure the surface shape of that cast using laser light or the like. When considering the current state of precision, measuring range and the like of the corneal surface shape measuring device, in terms of precision, it is preferable to do the latter, to make a mold of the human eye corneal surface directly and measure it.

The obtained corneal surface shape of the population is processed using a statistical method. Specifically, for example when the population is myopic eyes, it is also possible to obtain the corneal surface shape of all the myopic eyes, but since that is unrealistic, it is possible to obtain statistical information of the corneal surface shape by implementing processing such as averaging from the results of a sample survey of a suitable number extracted from the population.

Obtaining statistical information on the corneal surface shape is executed at step S5 with this mode. Here, the statistical information whose subject is the population's corneal surface shape can be understood, as an average value, for example, with numerical values as the height information of each position on the cornea, or can be understood with a numerical equation as a line or surface shape for which each position is continuous in the radial direction, circumference direction, or surface direction. Also, as statistical information, when each position on the cornea is represented by the Z value representing height on the XY plane orthogonal to the optical axis, for example, assuming that the Z value at each position is roughly normally distributed, it is possible to use a shape that connects an average value such as the arithmetic mean of each position or the like, or a representative value such as a mode, median or the like as the average value of the cornea shape. Also, as statistical information of the corneal surface shape, in addition to shape information of the corneal surface as an average value, it is preferable to obtain statistical data such as standard deviation (σ, Sigma), dispersion or the like at the same time.

Figure 4:
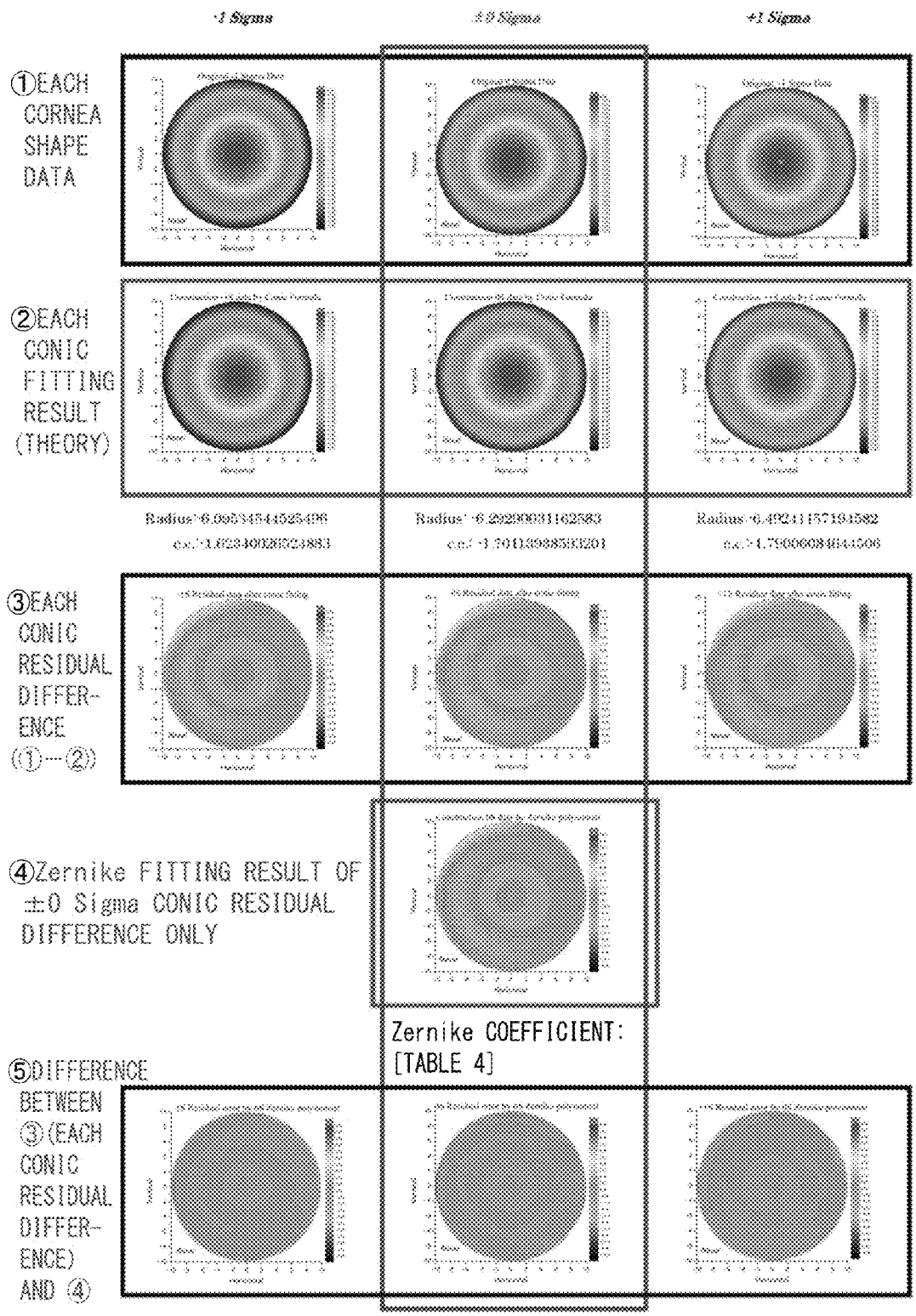
FIG. 4 is a drawing suitable for explaining color mappings showing as one mode of the manufacturing method of a contact lens according to the method of the present invention corneal surface shapes and each rotationally symmetrical and rotationally asymmetric definitional equation used therefor, together with the residual difference after fitting.

As a specific example of statistical information of the corneal surface shape, data for 40 eyes which are standard myopic eyes which are the subject of this mode from the corneal surface shape of 120 adult eyes obtained by the inventors are shown by color mapping display on the topmost level in FIG. 4. This statistical information shows the average value (±0σ) of the corneal surface shape of diameter 20 mm obtained through statistical processing based on measured data for which a mold for which the corneal surface shape of a human eye was directly transferred was three dimensionally measured using laser light. Similarly, the corneal surface shape connecting each position for −σ and +σ is shown together by color mapping display. Compared to the corneal surface shape of ±0σ, with the −σ corneal surface shape, the curve was found to be slightly larger, while with the +σ corneal surface shape, the curve was found to be slightly smaller. With this mode, "cornea" is the region of the human eye on which the contact lens is worn overlapping, and depending on the type or size of the subject contact lens, also includes the range of the sclera further to the outside than the outer circumference of the cornea. Also, with each color mapping display of FIG. 4, the vertical direction corresponds to the vertical direction of the cornea, and of the lateral direction, the Nasal side corresponds to the nose side.

Then, using the statistical information of the corneal surface shape obtained at step S5, in order to set the shape of the lens rear surface 20 that matches the information, it is preferable to obtain the information as a specific mathematical expression that defines a shape since it is possible to specifically specify the shape and usability is excellent when doing difference calculation and the like. However, since the corneal surface shape is extremely complex, the mathematical expression itself that tries to define with one mathematical expression a Zernike surface for which it is possible to specify a rotationally asymmetric shape, for example, becomes complex, and the handling when doing post-processing of that calculation and the like also becomes difficult.

Here, with this mode, the corneal surface shape was defined by mutually combining a mathematical expression that can define a rotationally symmetrical aspherical shape and a mathematical expression that can present a rotationally asymmetric aspherical shape. Also, as the former definitional equation of the rotationally symmetrical shape, a mathematical expression is used that can reflect the shape features using the radius of curvature and the conic constant, while as the latter definitional equation of the rotationally asymmetric shape, a mathematical expression was used expressing the Zernike surface.

In more specific terms, with this mode, at step S6, as the former definitional equation, an even-number order power series polynomial which is a well-known rotationally symmetrical aspherical surface definitional equation is used, and of the shape of the lens rear surface 20 conforming to the statistical information of the corneal surface shape obtained at step S5, the rotationally symmetrical aspherical shape was set. Also, at step S7, as the latter definitional equation, a Zernike polynomial which is a well-known rotationally asymmetric wave surface definitional equation was used, and of the shape of the lens rear surface 20 that conforms to the statistical information of the corneal surface shape obtained at step S5, the rotationally asymmetric aspherical shape was set. Then, at the subsequent step S8, both the former and latter definitional equations were totaled, and by overlapping the wave surface presented by the latter mathematical expression on the rotary quadric surface defined by the former mathematical expression, the corneal surface shape was defined.

The specific corneal surface shape definitional equation used with this mode is shown in Formula 5 below.

$$Z = \underbrace{\frac{\frac{x^2+y^2}{R}}{1+\sqrt{1-\frac{(1+C.C.)\cdot(x^2+y^2)}{R^2}}}}_{\substack{\text{Conic Formula}\\\left(\substack{\text{rotationally symmetrical}\\\text{aspherical surface formula}}\right)}} + \underbrace{\phantom{XXXXXXX}}_{\text{[Zernike Polynominal Formula]}} \quad \text{[Formula 5]}$$

Figure 5:
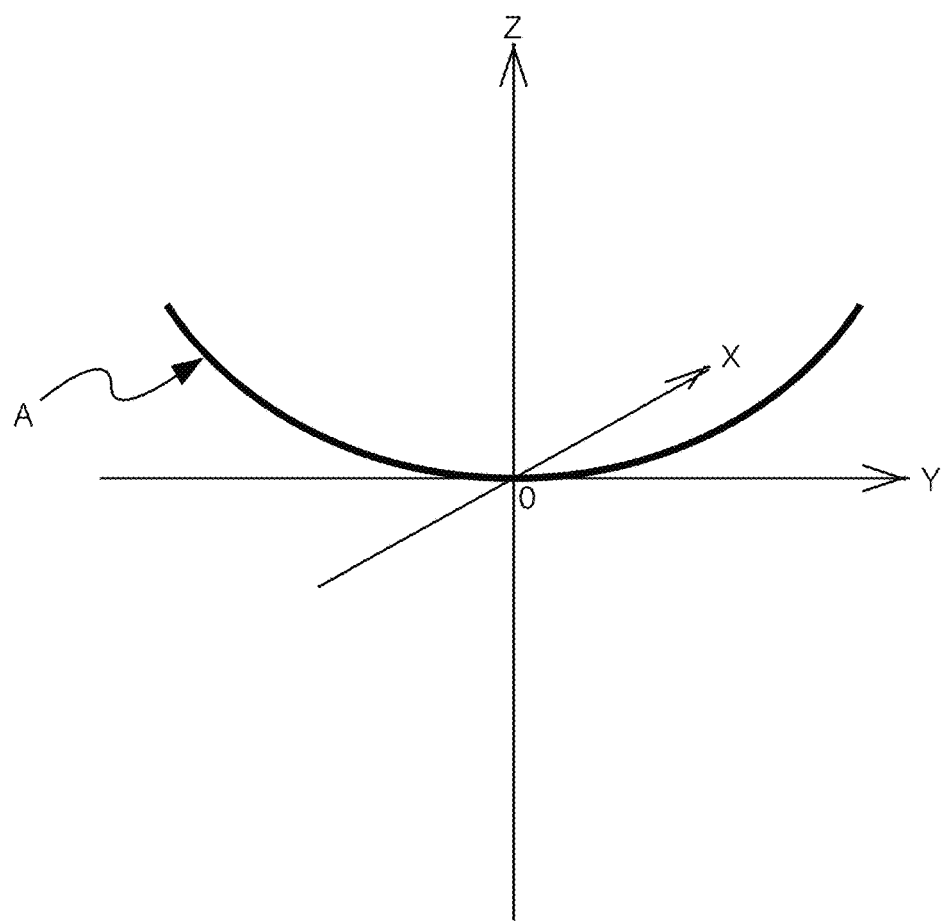
FIG. 5 is a drawing showing a coordinate system for defining a shape of a lens rear surface of the contact lens shown in FIG. 1 according to the present invention.

As shown in FIG. 5, Formula 5 noted above defines the shape of corneal surface A represented with origin point 0 as the vertex in the orthogonal three axis coordinate system, and is expressed as the sum of the first term aspherical surface polynomial (Conic Formula) and the second term Zernike polynomial (Zernike Polynomial Formula) of the right side.

The first term aspherical surface polynomial is an even-number order power series polynomial that is a well-known definitional equation of an aspherical surface lens shape, and with this mode, the high order terms of fourth order and beyond were omitted, and only a quadratic term with a spherical surface as a base was used. By using this aspherical surface polynomial at step S6, a conic section within the YZ plane is defined, and as the rotationally symmetrical shape around the Z axis of that conic section, it is possible to specify the rotationally symmetrical shape of the corneal surface shape.

The second term Zernike polynomial is also called a Zernike circular polynomial, and as is well known, expresses the numerical value distribution within a unit circle. For example, the position distribution in the Z axis direction on the XY plane is to be specified as a numerical value distribution, and at step S7, it is possible to use that Zernike polynomial with this mode.

With this mode, it would also be possible to apply the first term definitional equation of Formula 5 noted above to the rotationally symmetrical aspherical shape set at step S6 for the corneal surface base shape set at step S5. As a result, the rotationally asymmetric shape element remains as a residual difference without being reflected in that first term definitional equation. At step S7, it would be possible to find a Zernike polynomial that defines such rotationally asymmetric shape element, and to understand the polynomial as being used as the second term definitional equation of Formula 5.

As a specific Zernike polynomial, Formula 6 below expressed as a function of the polar coordinate system is used with this mode.

The Zernike Polynomial Formula is defined by the following polar coordinate system function.

$$W(\rho, \theta) = \sum_{n=0}^{k} \sum_{i=0}^{n} N_{\frac{n(n+2)+m}{2}} P_{\frac{n(n+2)+m}{2}} R_n^{|m|} \left\{ \begin{array}{l} \cos(m\theta) \\ \sin(-m\theta) \end{array} \right. \quad \text{[Formula 6]}$$

Where n: current order, m: frequency (2i−n), k: maximum order on the polynomial.

Also, $N_{\frac{n(n+2)+m}{2}}$ and $P_{\frac{n(n+2)+m}{2}}$ is the coefficient for the $$\frac{n(n+2)+m}{2}$$

th normalization coefficient and Zernike coefficient, and the normalization coefficient is as noted in the Formula below.

$$N_{\frac{n(n+2)+m}{2}} = \sqrt{2(n+1)} \quad \text{(when } m \neq 0\text{)}$$

$$N_{\frac{n(n+2)+m}{2}} = \sqrt{(n+1)} \quad \text{(when } m = 0\text{)}$$

Also, $R_n^{|m|}$ is represented by the following formula.

$$R_n^{|m|} = \sum_{s=0}^{(n-|m|)/2} \frac{(-1)^s (n-s)!}{s! [0.5(n+|m|)-s]! [0.5(n-|m|)-s]!} \rho^{n-2s}$$

The Zernike Polynomial Formula can be expressed more simply as shown by the formula below.

$$W(\rho, \theta) = \sum_{i=0}^{\infty} N_i P_i Z_i$$

Figure 6:
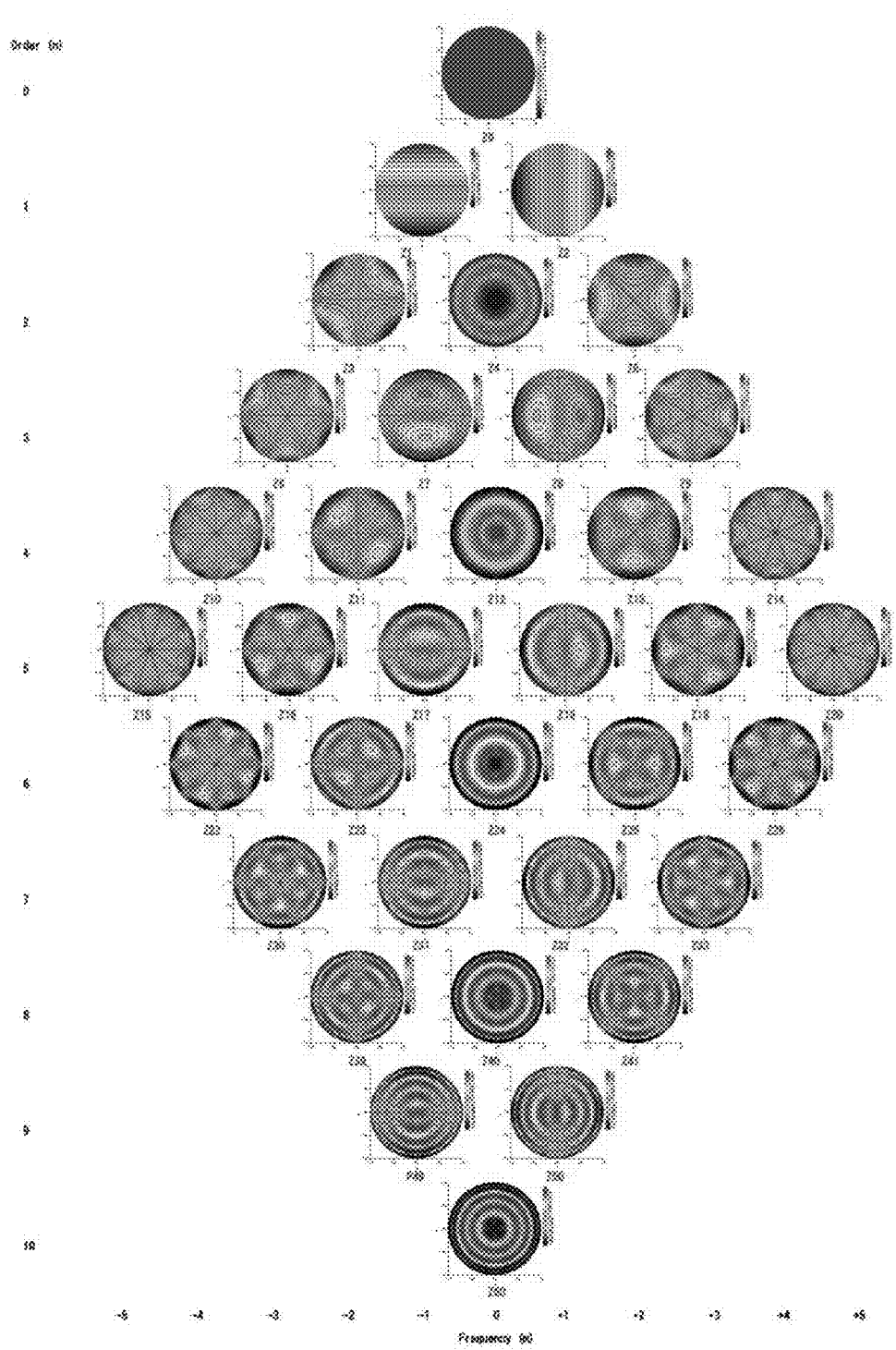
FIG. 6 is a drawing suitable for explaining a mapping display of each element for the Zernike function that can be suitably used with the method of the present invention.

With the Zernike polynomial shown in this Formula 6, each term can be specified with values of two integers n and m. The integer n shows the current order of the radial direction polynomial, while the integer m shows the number of waves in the rotation direction, and it is possible to specify the surface shape mode using these n and m. The Zernike function of each term is shown in polar coordinate values in Table 1 to Table 3, and is shown together in Table 1 in orthogonal three axis coordinate values. $\rho$ representing the position on the polar coordinate system is a radius vector expressed by $(r/r_{max})$ using radius r, and $\theta$ is the rotation angle, and with the orthogonal coordinate system, are $\sqrt{(x^2+y^2)}$ and $\tan^{-1}(y/x)$. Also, the results of displaying the numerical value distribution of each mode represented by the Zernike polynomial using color mapping are shown in FIG. 6 for reference.

TABLE 1

| n | m | Zernike function (polar coordinate) | Zernike function (orthogonal coordinate) |
|---|---|---|---|
| 0 | 0 | C0 | C0 |
| +1 | −1 | C1 · √(4) · (ρ) · sin(θ) | C1 · ((y)) · √(4) |
| +1 | +1 | C2 · √(4) · (ρ) · cos(θ) | C2 · ((x)) · √(4) |
| +2 | −2 | C3 · √(6) · (ρ²) · sin(2θ) | C3 · ((2 · x · y)) · √(6) |
| +2 | 0 | C4 · √(3) · (2 · (ρ²) − 1) | C4 · (((2 · (x²)) + (2 · (y²)) − 1)) · √(3) |
| +2 | +2 | C5 · √(6) · (ρ²) · cos (2θ) | C5 · (((x²) − (y²))) · √(6) |
| +3 | −3 | C6 · √(8) · (ρ³) · sin (3θ) | C6 · (((3 · (x²) · y) − (y³))) · √(8) |
| +3 | −1 | C7 · √(8) · (3 · (ρ³) − 2 · ρ) · sin (θ) | C7 · (((3 · (x²) · y) + (3 · (y³)) − (2 · y))) · √(8) |
| +3 | +1 | C8 · √(8) · (3 · (ρ³) − 2 · ρ) · cos (θ) | C8 · (((3 · (x³)) + (3 · x · (y²)) − (2 · x))) · √(8) |
| +3 | +3 | C9 · √(8) · (ρ³) · cos (3θ) | C9 · (((x³) − (3 · x · (y²)))) · √(8) |
| +4 | −4 | C10 · √(10) · (ρ⁴) · sin (4θ) | C10 · (((4 · (x³) · y) − (4 · x · (y³)))) · √(10) |
| +4 | −2 | C11 · √(10) · (4 · (ρ⁴) − 3 · (ρ²)) · sin (2θ) | C11 · (((8 · (x³) · y) + (8 · x · (y³)) − (6 · x · y))) · √(10) |
| +4 | 0 | C12 · √(5) · (6 · (ρ⁴) − 6 · (ρ²) + 1) | C12 · (((6 · (x⁴)) + (12 · (x²) · (y²)) + (6 · (y⁴)) − (6 · (x²)) − (6 · (y²)) + 1)) · √(5) |
| +4 | +2 | C13 · √(10) · (4 · (ρ⁴) − 3 · (ρ²)) · cos (2θ) | C13 · (((4 · (x⁴)) + (4 · (x²) · (y²)) − (3 · (x²)) − (4 · (x²) · (y²) − (4 · (y⁴)) + (3 · (y²)))) · √(10) |
| +4 | +4 | C14 · √(10) · ( ρ⁴) · cos (4θ) | C14 · (((x⁴) − (6 · (x²) · (y²)) + (y⁴))) · √(10) |
| +5 | −5 | C15 · √(12) · (ρ⁵) · sin (5θ) | C15 · (((5 · (x⁴) · y) − (10 · (x²) · (y³)) + (y⁵))) · √(12) |

TABLE 1-continued

| n | m | Zernike function (polar coordinate) | Zernike function (orthogonal coordinate) |
|---|---|---|---|
| +5 | −3 | $C16 \cdot \sqrt{12} \cdot (5 \cdot (\rho^5) - 4 \cdot (\rho^3)) \cdot \sin(3\theta)$ | $C16 \cdot (((15 \cdot (x^4) \cdot y) + (10 \cdot (x^2) \cdot (y^3)) - (12 \cdot (x^2) \cdot y) - (5 \cdot (y^5)) + (4 \cdot (y^3)))) \cdot \sqrt{12}$ |
| +5 | −1 | $C17 \cdot \sqrt{12} \cdot (10 \cdot (\rho^5) - 12 \cdot (\rho^3) + 3 \cdot \rho) \cdot \sin(\theta)$ | $C17 \cdot (((10 \cdot (x^4) \cdot y) + (20 \cdot (x^2) \cdot (y^3)) + (10 \cdot (y^5)) - (12 \cdot (x^2) \cdot y) - (12 \cdot (y^3)) + (3 \cdot y))) \cdot \sqrt{12}$ |
| +5 | +1 | $C18 \cdot \sqrt{12} \cdot (10 \cdot (\rho^5) - 12 \cdot (\rho^3) + 3 \cdot \rho) \cdot \cos(\theta)$ | $C18 \cdot (((10 \cdot (x^5)) + (20 \cdot (x^3) \cdot (y^2)) + (10 \cdot x \cdot (y^4)) - (12 \cdot (x^3)) - (12 \cdot x \cdot (y^2)) + (3 \cdot x))) \cdot \sqrt{12}$ |
| +5 | +3 | $C19 \cdot \sqrt{12} \cdot (5 \cdot (\rho^5) - 4 \cdot (\rho^3)) \cdot \cos(3\theta)$ | $C19 \cdot (((5 \cdot (x^5)) - (4 \cdot (x^3)) - (10 \cdot (x^3) \cdot (y^2)) - (15 \cdot x \cdot (y^4)) + (12 \cdot x \cdot (y^2)))) \cdot \sqrt{12}$ |

TABLE 2

| n | m | Zernike function (polar coordinate) | Zernike function (orthogonal coordinate) |
|---|---|---|---|
| +5 | +5 | $C20 \cdot \sqrt{12} \cdot (\rho^5) \cdot \cos(5\theta)$ | $C20 \cdot (((x^5) - (10 \cdot (x^3) \cdot (y^2)) + (5 \cdot x \cdot (y^4)))) \cdot \sqrt{12}$ |
| +6 | −4 | $C22 \cdot \sqrt{14} \cdot (6 \cdot (\rho^6) - 5 \cdot (\rho^4)) \cdot \sin(4\theta)$ | $C22 \cdot (((24 \cdot (x^5) \cdot y) - (20 \cdot (x^3) \cdot y) - (24 \cdot x \cdot (y^5)) + (20 \cdot x \cdot (y^3)))) \cdot \sqrt{14}$ |
| +6 | −2 | $C23 \cdot \sqrt{14} \cdot (15 \cdot (\rho^6) - 20 \cdot (\rho^4) + 6 \cdot (\rho^2)) \cdot \sin(2\theta)$ | $C23 \cdot (((30 \cdot (x^5) \cdot y) + (60 \cdot (x^3) \cdot (y^3)) + (30 \cdot x \cdot (y^5)) - (40 \cdot (x^3) \cdot y) - (40 \cdot x \cdot (y^3)) + (12 \cdot x \cdot y))) \cdot \sqrt{14}$ |
| +6 | 0 | $C24 \cdot \sqrt{7} \cdot (20 \cdot (\rho^6) - 30 \cdot (\rho^4) + 12 \cdot (\rho^2) - 1)$ | $C24 \cdot (((20 \cdot (x^6)) + (60 \cdot (x^4) \cdot (y^2)) + (60 \cdot (x^2) \cdot (y^4)) + (20 \cdot (y^6)) - (30 \cdot (x^4)) - (60 \cdot (x^2) \cdot (y^2)) - (30 \cdot (y^4)) + (12 \cdot (x^2)) + (12 \cdot (y^2)) - 1) \cdot \sqrt{7}$ |
| +6 | +2 | $C25 \cdot \sqrt{14} \cdot (15 \cdot (\rho^6) - 20 \cdot (\rho^4) + 6 \cdot (\rho^2)) \cdot \cos(2\theta)$ | $C25 \cdot (((15 \cdot (x^6)) + (15 \cdot (x^4) \cdot (y^2)) - (20 \cdot (x^4)) + (6 \cdot (x^2)) - (15 \cdot (x^2) \cdot (y^4)) - (15 \cdot (y^6)) + (20 \cdot (y^4)) - (6 \cdot (y^2)))) \cdot \sqrt{14}$ |
| +6 | +4 | $C26 \cdot \sqrt{14} \cdot (6 \cdot (\rho^6) - 5 \cdot (\rho^4)) \cdot \cos(4\theta)$ | $C26 \cdot (((6 \cdot (x^6)) - (5 \cdot (x^4)) - (30 \cdot (x^4) \cdot (y^2)) - (30 \cdot (x^2) \cdot (y^4)) + (30 \cdot (x^2) \cdot (y^2)) + (6 \cdot (y^6)) - (5 \cdot (y^4)))) \cdot \sqrt{14}$ |
| +7 | −3 | $C30 \cdot \sqrt{16} \cdot (21 \cdot (\rho^7) - 30 \cdot (\rho^5) + 10 \cdot (\rho^3)) \cdot \sin(3\theta)$ | $C30 \cdot (((63 \cdot (x^6) \cdot y) + (105 \cdot (x^4) \cdot (y^3)) + (21 \cdot (x^2) \cdot (y^5)) - (90 \cdot (x^4) \cdot y) - (60 \cdot (x^2) \cdot (y^3)) + (30 \cdot (x^2) \cdot y) - (21 \cdot (y^7)) + (30 \cdot (y^5)) - (10 \cdot (y^3)))) \cdot \sqrt{16}$ |
| +7 | −1 | $C31 \cdot \sqrt{16} \cdot (35 \cdot (\rho^7) - 60 \cdot (\rho^5) + 30 \cdot (\rho^3) - 4 \cdot \rho) \cdot \sin(\theta)$ | $C31 \cdot (((35 \cdot (x^6) \cdot y) + (105 \cdot (x^4) \cdot (y^3)) + (105 \cdot (x^2) \cdot (y^5)) + (35 \cdot (y^7)) - (60 \cdot (x^4) \cdot y) - (120 \cdot (x^2) \cdot (y^3)) - (60 \cdot (y^5)) + (30 \cdot (x^2) \cdot y) + (30 \cdot (y^3)) - (4 \cdot y))) \cdot \sqrt{16}$ |
| +7 | +1 | $C32 \cdot \sqrt{16} \cdot (35 \cdot (\rho^7) - 60 \cdot (\rho^5) + 30 \cdot (\rho^3) - 4 \cdot \rho) \cdot \cos(\theta)$ | $C32 \cdot (((35 \cdot (x^7)) + (105 \cdot (x^5) \cdot (y^2)) + (105 \cdot (x^3) \cdot (y^4)) + (35 \cdot x \cdot (y^6)) - (60 \cdot (x^5)) - (120 \cdot (x^3) \cdot (y^2)) - (60 \cdot x \cdot (y^4)) + (30 \cdot (x^3)) + (30 \cdot x \cdot (y^2)) - (4 \cdot x))) \cdot \sqrt{16}$ |
| +7 | +3 | $C33 \cdot \sqrt{16} \cdot (21 \cdot (\rho^7) - 30 \cdot (\rho^5) + 10 \cdot (\rho^3)) \cdot \cos(3\theta)$ | $C33 \cdot (((21 \cdot (x^7)) - (21 \cdot (x^5) \cdot (y^2)) - (105 \cdot (x^3) \cdot (y^4)) - (30 \cdot (x^5)) + (60 \cdot (x^3) \cdot (y^2)) + (10 \cdot (x^3)) - (63 \cdot x \cdot (y^6)) + (90 \cdot x \cdot (y^4)) - (30 \cdot x \cdot (y^2)))) \cdot \sqrt{16}$ |
| +8 | −2 | $C39 \cdot \sqrt{18} \cdot (56 \cdot (\rho^8) - 105 \cdot (\rho^6) + 60 \cdot (\rho^4) - 10 \cdot (\rho^2)) \cdot \sin(2\theta)$ | $C39 \cdot (((112 \cdot (x^7) \cdot y) + (336 \cdot (x^5) \cdot (y^3)) + (336 \cdot (x^3) \cdot (y^5)) + (112 \cdot x \cdot (y^7)) - (210 \cdot (x^5) \cdot y) - (420 \cdot (x^3) \cdot (y^3)) - (210 \cdot x \cdot (y^5)) + (120 \cdot (x^3) \cdot y) + (120 \cdot x \cdot (y^3)) - (20 \cdot x \cdot y))) \cdot \sqrt{18}$ |

TABLE 3

| n | m | Zernike function (polar coordinate) | Zernike function (orthogonal coordinate) |
|---|---|---|---|
| +8 | 0 | $C40 \cdot \sqrt{9} \cdot (70 \cdot (\rho^8) - 140 \cdot (\rho^6) + 90 \cdot (\rho^4) - 20 \cdot (\rho^2) + 1)$ | $C40 \cdot (((70 \cdot (x^8)) + (280 \cdot (x^6) \cdot (y^2)) + (420 \cdot (x^4) \cdot (y^4)) + (280 \cdot (x^2) \cdot (y^6)) + (70 \cdot (y^8)) - (140 \cdot (x^6)) - (420 \cdot (x^4) \cdot (y^2)) - (420 \cdot (x^2) \cdot (y^4)) - (140 \cdot (y^6)) + (90 \cdot (x^4)) + (180 \cdot (x^2) \cdot (y^2)) + (90 \cdot (y^4)) - (20 \cdot (x^2)) - (20 \cdot (y^2)) + 1)) \cdot \sqrt{9}$ |
| +8 | +2 | $C41 \cdot \sqrt{18} \cdot (56 \cdot (\rho^8) - 105 \cdot (\rho^6) + 60 \cdot (\rho^4) - 10 \cdot (\rho^2)) \cdot \cos(2\theta)$ | $C41 \cdot (((56 \cdot (x^8)) + (112 \cdot (x^6) \cdot (y^2)) - (112 \cdot (x^2) \cdot (y^6)) - (105 \cdot (x^6)) - (105 \cdot (x^4) \cdot (y^2)) + (105 \cdot (x^2) \cdot (y^4)) + (60 \cdot (x^4)) - (10 \cdot (x^2)) - (56 \cdot (y^8)) + (105 \cdot (y^6)) - (60 \cdot (y^4)) + (10 \cdot (y^2)))) \cdot \sqrt{18}$ |
| +9 | −1 | $C49 \cdot \sqrt{20} \cdot (126 \cdot (\rho^9) - 280 \cdot (\rho^7) + 210 \cdot (\rho^5) - 60 \cdot (\rho^3) + 5 \cdot \rho) \cdot \sin(\theta)$ | $C49 \cdot (((126 \cdot (x^8) \cdot y) + (504 \cdot (x^6) \cdot (y^3)) + (756 \cdot (x^4) \cdot (y^5)) + (504 \cdot (x^2) \cdot (y^7)) + (126 \cdot (y^9)) - (280 \cdot (x^6) \cdot y) - (840 \cdot (x^4) \cdot (y^3)) - (840 \cdot (x^2) \cdot (y^5)) - (280 \cdot (y^7)) + (210 \cdot (x^4) \cdot y) + (420 \cdot (x^2) \cdot (y^3)) + (210 \cdot (y^5)) - (60 \cdot (x^2) \cdot y) - (60 \cdot (y^3)) + (5 \cdot y))) \cdot \sqrt{20}$ |
| +9 | +1 | $C50 \cdot \sqrt{20} \cdot (126 \cdot (\rho^9) - 280 \cdot (\rho^7) + 210 \cdot (\rho^5) - 60 \cdot (\rho^3) + 5 \cdot \rho) \cdot \cos(\theta)$ | $C50 \cdot (((126 \cdot (x^9)) + (504 \cdot (x^7) \cdot (y^2)) + (756 \cdot (x^5) \cdot (y^4)) + (504 \cdot (x^3) \cdot (y^6)) + (126 \cdot x \cdot (y^8)) - (280 \cdot (x^7)) - (840 \cdot (x^5) \cdot (y^2)) - (840 \cdot (x^3) \cdot (y^4)) - (280 \cdot x \cdot (y^6)) + (210 \cdot (x^5)) + (420 \cdot (x^3) \cdot (y^2)) + (210 \cdot x \cdot (y^4)) - (60 \cdot (x^3)) - (60 \cdot x \cdot (y^2)) + (5 \cdot x))) \cdot \sqrt{20}$ |
| +10 | 0 | $C60 \cdot \sqrt{11} \cdot (252 \cdot (\rho^{10}) - 630 \cdot (\rho^8) + 560 \cdot (\rho^6) - 210 \cdot (\rho^4) + 30 \cdot (\rho^2) - 1)$ | $C60 \cdot (((252 \cdot (x^{10})) + (1260 \cdot (x^8) \cdot (y^2)) + (2520 \cdot (x^6) \cdot (y^4)) + (2520 \cdot (x^4) \cdot (y^6)) + (1260 \cdot (x^2) \cdot (y^8)) + (252 \cdot (y^{10})) - (630 \cdot (x^8)) - (2520 \cdot (x^6) \cdot (y^2)) - (3780 \cdot (x^4) \cdot (y^4)) - (2520 \cdot (x^2) \cdot (y^6)) - (630 \cdot (y^8)) + (560 \cdot (x^6)) + (1680 \cdot (x^4) \cdot (y^2)) + (1680 \cdot (x^2) \cdot (y^4)) + (560 \cdot (y^6)) - (210 \cdot (x^4)) - (420 \cdot (x^2) \cdot (y^2)) - (210 \cdot (y^4)) + (30 \cdot (x^2)) + (30 \cdot (y^2)) - 1)) \cdot \sqrt{11}$ |

Specifically, at step S6, using the first term aspherical surface polynomial in Formula 5 noted above, by selecting R (radius of curvature of the vertex) and C.C. (conic constant) corresponding to the corneal surface shape obtained from the cornea statistical information of the population at step S5, the definitional equation of the rotationally symmetrical surface shape is set. Also, at step S7, using the Zernike polynomial in Formula 6 noted above, by selecting the Zernike coefficient expressing the residual difference element of the corneal surface shape obtained from the cornea statistical information of the population at step S5, the definition equation of the rotationally asymmetric surface shape is set.

Incidentally, at step S5 noted above, each corneal surface shape ($\pm 0\sigma$), ($-1\sigma$), ($+1\sigma$) found from the statistical information with 40 eyes which are standard myopic eyes as subjects shown in the topmost layer in FIG. 4 and was set as the base shape, and at step S6 noted above, the definitional equation of the rotationally symmetrical aspherical shape shown in the first term of Formula 5 underwent fitting, then Formula 7 below was obtained. The rotationally symmetrical aspherical shapes defined by this Formula 7 are respectively shown by color mapping display on the second level in FIG. 4.

$$Z = \frac{\frac{x^2 + y^2}{R}}{1 + \sqrt{1 - \frac{(1 + C.C.) \cdot (x^2 + y^2)}{R^2}}} \quad \text{[Formula 7]}$$

With $-1\sigma$,
R=−6.09534544525496 mm
C.C.=−1.62340026524883
With $\pm 0\sigma$,
R=−6.29290031162583 mm
C.C.=−1.700113938593201
With $+1\sigma$,
R=−6.49241157194582 mm
C.C.=−1.79006084644506

Also, the rotationally symmetrical aspherical shapes defined by Formula 7 above are each applied to the original corresponding corneal surface shape, and the aspherical shape remaining as the corneal surface shape (conic residual difference) is shown by color mapping display on the third level in FIG. 4.

Furthermore, at step S7 noted above, with the $\pm 0\sigma$ corneal surface shape as the corneal surface base shape, the Zernike polynomial which is the definitional equation of the rotationally asymmetric aspherical shape shown in the second term of Formula 5 above underwent fitting, then the Zernike coefficient shown in Table 4 below was obtained. In the fitting of that Zernike polynomial, the subject is the corneal surface base shape shown in the center of the topmost level in FIG. 4, but substantially can also be thought of as fitting of the Zernike polynomial on the aspherical shape of the conic residual difference shown in the center of the third level in FIG. 4. Also, with this mode, as shown in Table 4, as each coefficient $C_i$ with the Zernike polynomial, each coefficient of Zernike terms of i=0 to 20, 22 to 26, 30 to 33, 39 to 41, 49 to 50, and 60 was used, and fitting was performed by specifying each coefficient value of those.

TABLE 4

| Zernike coefficient | $\pm 0\sigma$ coefficient value |
|---|---|
| C0 | −9.68450677388851E−4 |
| C1 | 8.99654244101557E−6 |
| C2 | −0.00111801543945195 |
| C3 | −1.37702826975878E−4 |
| C4 | 0.00523554095799223 |

TABLE 4-continued

| Zernike coefficient | $\pm 0\sigma$ coefficient value |
|---|---|
| C5 | 3.81927075845453E−4 |
| C6 | 7.61953012550708E−6 |
| C7 | −4.43473958071473E−6 |
| C8 | 2.54602362594547E−5 |
| C9 | −3.29566791657737E−6 |
| C10 | 9.32328950340547E−7 |
| C11 | −1.11104351359765E−6 |
| C12 | −8.92169122302812E−5 |
| C13 | −4.95446511372142E−6 |
| C14 | 3.90325488271086E−7 |
| C15 | 4.15802255963233E−9 |
| C16 | −9.644125041583E−8 |
| C17 | 1.5185965638242E−7 |
| C18 | 4.45628062858969E−7 |
| C19 | −1.5915961964478E−8 |
| C20 | −1.16866601187391E−8 |
| C22 | −6.80052616320041E−10 |
| C23 | 6.26574901099097E−9 |
| C24 | 4.84161112298266E−7 |
| C25 | 2.08831193021852E−8 |
| C26 | −1.40089344877558E−9 |
| C30 | 1.72023155590273E−10 |
| C31 | −4.53307082388049E−10 |
| C32 | −2.81456176662176E−9 |
| C33 | 9.20655481364754E−11 |
| C39 | −9.32029206040988E−12 |
| C40 | −1.06703542371861E−9 |
| C41 | −2.77195791801719E−11 |
| C49 | 4.13537860799161E−13 |
| C50 | 3.74382185584814E−12 |
| C60 | 8.37838511746401E−13 |

The rotationally asymmetric aspherical shape defined by the Zernike polynomial (Formula 6) having each coefficient value of Table 4 is shown by color mapping display on the fourth level in FIG. 4. We can see that the Zernike surface shape shown by color mapping display corresponds with good precision to the conic residual difference shown by color mapping display at the center of the third level in FIG. 4. Therefore, by using this Zernike surface shape, it is possible to offset conic residual difference, and as a result, we can see that the irregularities on the corneal surface are almost all eliminated, and a high level shape fitting to a level for which only a slight height of about 0.1 mm (Z axis direction) change is found is realized. This can be confirmed also from the results of color mapping display of the difference of the result of applying the Zernike surface to the conic residual difference shown in the center of the bottommost level in FIG. 4.

Therefore, for the corneal surface base shape set at step 5, using the definitional equation of the rotationally symmetrical aspherical shape (conic shape with this mode) set at step 6, and the definitional equation of the rotationally asymmetric aspherical shape (Zernike shape with this mode) set at step 7, at step S8, those definitional equations are combined as in Formula 5 noted above. By so doing, it is possible to relatively easily specify the corneal shape of a standard myopic eye which is the subject for contact lens wearing by combining precise and regular mathematical expressions.

Also, with this mode which obtained statistical information of the corneal surface shape with standard myopic eyes as the population, corneal surface shapes of average value ($\pm 0\sigma$) and $-1\sigma$ and $+1\sigma$ shown on the topmost level in FIG. 4 do not differ greatly from one another, which can also be confirmed by the color mapping displays (each display on the second level in FIG. 4) of the rotationally symmetrical aspherical shape and the color mapping displays (each display on the third level in FIG. 4) of the rotationally asymmetric aspherical shape each defined correspondingly. Also, from this fact, as described above, by having an average value obtained from the statistical information with the selected population as the target or a surface shape close to that as the base shape, and by defining that base shape by combining the conic shape and the Zernike shape, we can see that it is possible to specify the lens rear surface corresponding to the corneal surface shapes of almost all the users that are subjects.

Incidentally, the process of fitting the definitional equation of the rotationally symmetrical surface shape with the above-described ±0σ corneal surface shape as the corneal surface base shape and finding the residual difference (conic residual difference) was performed on each corneal surface base shape of −1σ and +1σ at left and right on the upper level in FIG. 4. The surface shapes according to the definitional equation of the rotationally symmetrical surface shape found with each corneal surface base shape of those −1σ and +1σ as the subject are shown with color mapping display respectively at the left and right on the second level in FIG. 4, and the color mapping displays of the conic residual differences obtained by applying those definitional equations to the corneal surface base shape are respectively shown at the left and right on the third level in FIG. 4.

From the three color mapping displays shown on the third level of FIG. 4, we can see that as statistical information of the corneal surface shape, the conic residual difference obtained with the average value (±0σ) as the subject and the conic residual difference obtained with the corneal surface base shape of either of −1σ and +1σ as the subject do not differ greatly.

Considering this fact, shape fitting was performed by applying the Zernike surface (see the fourth level in FIG. 4) specified by each coefficient of Table 4 above obtained at step S7 with the corneal surface base shape of the average value (±0σ) as the subject on each corneal surface base shape of −1σ and +1σ. The differences as a result thereof are respectively shown with color mapping display at the left and right on the bottommost level in FIG. 4.

The results of the respective color mappings displayed at left and right on the bottommost level in FIG. 4 in this way were obtained by the following. At step S5, based on the statistical information, in addition to the corneal surface shape of ±0σ, each corneal shape of −1σ and +1σ is set as the corneal surface base shape. At step S6, conic fitting is performed for each corneal surface base shape of −1σ and +1σ, and the definition equation of the rotationally symmetrical aspherical shape is set individually. Then, at step S7, the Zernike coefficient is selected with the ±0σ corneal surface base shape as the subject, and the definitional equation of the rotationally asymmetric aspherical shape is set by the Zernike polynomial.

Also, the definitional equation of the rotationally symmetrical aspherical shape for each corneal surface base shape of −1σ and +1σ set at step 6 and the definitional equation of the rotationally asymmetric aspherical shape for which the corneal surface base shape of ±0σ was the subject set at step 7 are combined at the subsequent step S8 as shown in Formula 5 above. By so doing, the same as when using only the corneal surface base shape of average value (±0σ) described previously, it is possible to excellently specify the corneal surface shape with the standard myopic eye as the subject of contact lens wearing.

Therefore, it is preferable that, in addition to the corneal surface shape found using only the corneal surface base shape of average value (±0σ), the corneal surface shapes found using the corneal surface shapes of −1σ and +1σ as described above are used as another lens rear surface shape and are concomitantly prepared to be provided to the market, so as to make it possible to make a selection when prescribing contact lenses for each contact lens user.

The lens rear surface shape corresponding to the corneal surface base shape set at steps S4 to S8 as described above can also be used across roughly the entire surface of the lens rear surface 20 of the contact lens 10. However, with this mode, the lens rear surface shape corresponding to the corneal surface base shape is used only on the peripheral zone 16. Specifically, only on the peripheral zone, a peripheral area is provided for which the lens rear surface shape corresponding to the corneal surface shape is used.

By so doing, with the optical zone 14, by setting a complex aspherical shape on the lens rear surface 20, the desired effect of improving the wearing comfort can be achieved, while it is possible to avoid having an adverse effect on the optical characteristics and making design and production more complex for the lens front surface 18. In fact, the peripheral zone 16 is a part for stabilizing the lens position on the cornea, and by setting the lens rear surface shape that corresponds to the cornea shape, the effect of improving the wearing comfort when overlapped in contact on the corneal surface is great. On the other hand, with the optical zone 14, it is possible to be worn in a state where a clearance forming surface provided at the lens rear surface 20 floats by a designated distance from the cornea to form a clearance and a lacrimal fluid layer is provided therebetween, and the effect given to the wearing comfort by the difference with the corneal surface shape is small.

In specific terms, at step S9, considering together the shape of the optical zone 14 set at step S3 and the shape of the peripheral zone 16 using the shape of the lens rear surface 20 set at steps S4 to S8, the overall shape design is determined including the lens front and rear surfaces 18 and 20 and the edge part 17 of the contact lens 10. As a determining method for more specific lens design, it is possible to suitably use conventional lens surface design methods, such as while ensuring the lens minimum thickness dimension, providing connecting surfaces as appropriate that connect in a smooth curve in the radial direction the boundary part of the optical zone 14 and the peripheral zone 16, and the boundary part of the peripheral zone 16 and the edge part 17 with the lens front and rear surfaces 18 and 20, providing an edge lift that gradually separates from the corneal surface from the outer circumference edge part of the lens rear surface 20 of the peripheral zone 16 toward the edge part 17 and the like.

Then, after determining at step S9 the specific lens shape having the target optical characteristics as well as the lens shape equipped with the lens rear surface 20 corresponding to the corneal surface shape of the population, at the subsequent step S10, the contact lens is produced equipped with the determined lens shape, and by obtaining the target contact lens 10, the contact lens production process is completed (step S11).

Here, with manufacturing of the contact lens 10, the same as is well known from the past for hard contact lenses, it is possible to use a cutting and polishing method that cuts a portion from a lens block (blank) produced by polymerizing lens material and cuts and polishes to the target shape. However, in addition, it is also possible to use a mold polymerization method that produces the target contact lens by filling and polymerizing a polymerizing monomer mixed liquid in a molding die equipped with a molding cavity corresponding to the target lens shape to manufacture the target contact lens. Also, in the case of soft contact lenses, in addition to the cutting and polishing method or the mold polymerization method, it is also possible to do production using a spin-casting method or the like.

This kind of contact lens 10 produced according to this mode is given a shape corresponding with good precision to the corneal surface of the user group that is the target at the lens rear surface 20 of the peripheral zone 16 for which there is a particularly big effect on the wearing comfort. This is clear from the fact that the difference of the lens rear surface 20 of the contact lens 10 provided by this mode is suppressed to about 0.1 mm from the corneal surface shape of the average (±0σ) of the user group or furthermore, from the corneal surface shape within a range of −σ and +σ thereof shown on the topmost level in FIG. 4, for example. Therefore, with this mode, it is not necessary to have unrealistic handling such as individually measuring the corneal surface shape of each user and analyzing or producing lenses of a corresponding shape for each user. Thus, by setting a surface shape that is standardized to some degree for the lens rear surface 20, it is possible to realize wearing comfort.

Above, we gave a detailed description of one mode of embodiments of the present invention, but the present invention is not to be interpreted as being limited to that mode.

Figure 7:
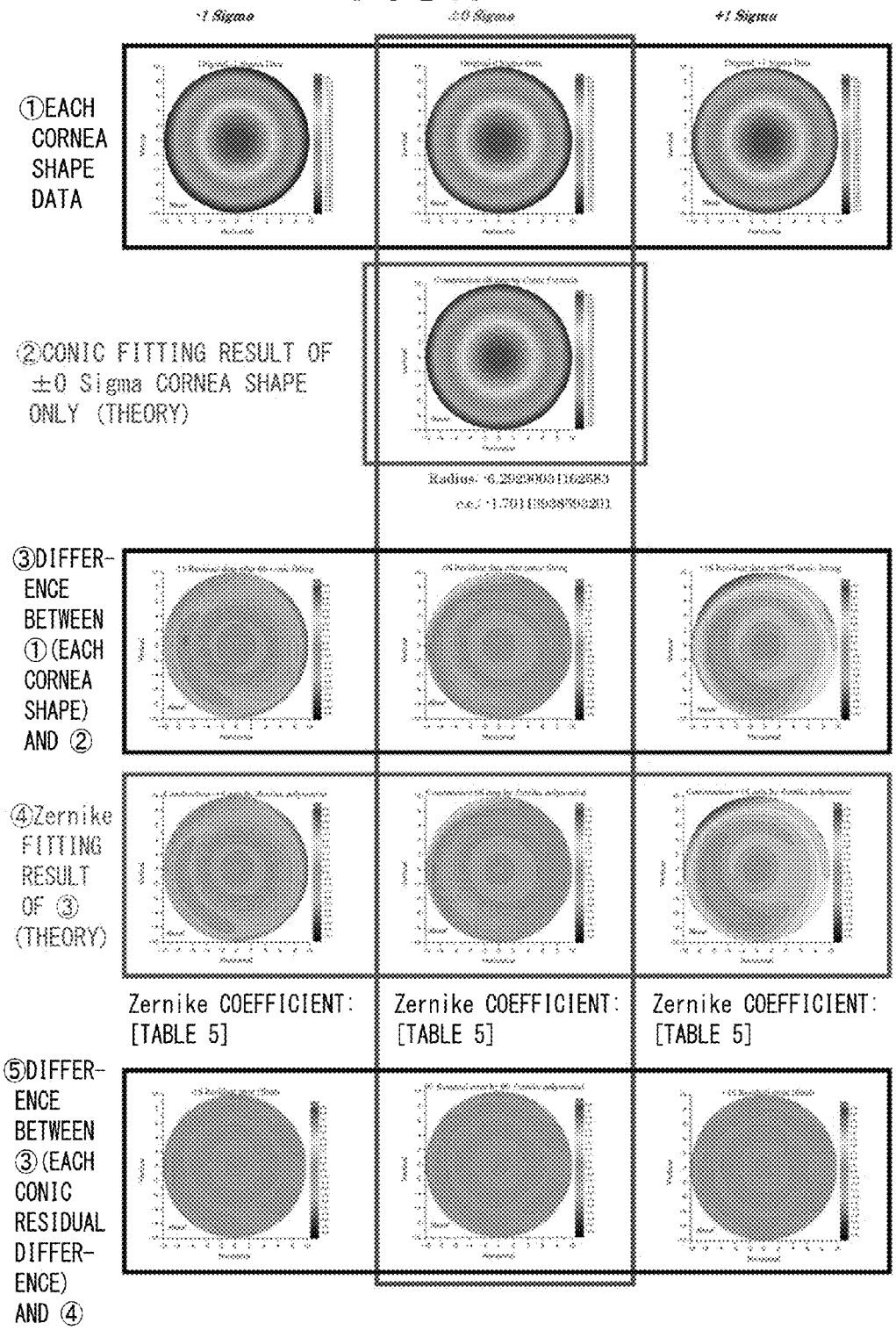
FIG. 7 is a drawing suitable for explaining color mappings showing as another mode of the manufacturing method of a contact lens according to the method of the present invention corneal surface shapes and each rotationally symmetrical and rotationally asymmetric definitional equation used therefor, together with the residual difference after fitting.

For example, with the mode noted above, with the corneal surface shape of the average (±0σ) and with each corneal surface shape −σ and +σ shown on the topmost level in FIG. 4, focusing on the fact that the rotationally asymmetric aspherical shapes shown on the third level in FIG. 4 do not have a big difference, a common Zernike surface shape shown on the fourth level in FIG. 4 was used. However, since the rotationally asymmetrical aspherical shapes shown on the second level in FIG. 4 also do not have a very big difference, it is also possible to use a common conic fitting surface shape. FIG. 7 shows a specific example.

Specifically, as the common conic fitting surface, a specific example when the conic fitting surface using R and C.C. that define the average (±0σ) corneal surface shape is used is shown in FIG. 7. In this FIG. 7, the three color mapping displays on the topmost level are the same as FIG. 4 with the mode noted above, and the conic surface for which the average (±0σ) corneal surface shape is defined is shown by color mapping display on the second level. In addition, the differences (conic residual differences) obtained by applying that conic surface to each of the average (+0σ) corneal surface shape and the −σ and +σ corneal surface shapes are shown on the third level.

Also, the results of fitting with each conic residual difference defined by the Zernike surface shape shown on the third level in FIG. 7 are shown on the fourth level in FIG. 7, and each Zernike coefficient is shown in Table 5. With the mode shown in FIG. 4 noted above, a common Zernike surface was used for the average (±0σ) corneal surface shape and the −σ and +σ corneal surface shapes, but with this mode, the Zernike surface shape corresponding to the conic residual difference was found and defined for each corneal surface shape. Furthermore, the differences in the results of applying each of those Zernike surfaces to the corresponding conic residual difference (final remainders) are shown on the bottommost level of FIG. 7.

TABLE 5

| Zernike Standard coefficient | −1 σ coefficient value | ±0 σ coefficient value | +1 σ coefficient value |
| --- | --- | --- | --- |
| C0 | −0.00542176108349554 | −9.68450677388851E−4 | 0.00324645607462422 |
| C1 | 9.24749418246852E−5 | 8.99654244101557E−6 | −6.61609986511424E−5 |
| C2 | −0.0013303158514185 | −0.00111801543945195 | −9.59275353233143E−4 |
| C3 | −1.48173132192599E−4 | −1.37702826975878E−4 | −1.18407323578029E−4 |
| C4 | 0.00493692814315581 | 0.00523554095799223 | 0.00558699484659762 |
| C5 | 4.08608058038313E−4 | 3.81927075845453E−4 | 3.54314036050602E−4 |
| C6 | 1.05131324783736E−6 | 7.61953012550708E−6 | 1.38349987144096E−5 |
| C7 | −5.60769122279419E−6 | −4.43473958071473E−6 | −3.18991760255926E−6 |
| C8 | 1.47450490370185E−5 | 2.54602362594547E−5 | 3.70158029684084E−5 |
| C9 | −1.50408949832441E−5 | −3.29566791657376E−6 | 8.63073308506507E−6 |
| C10 | 1.31779917103066E−6 | 9.32328950340547E−7 | 5.67401568404756E−7 |
| C11 | −4.28954787932707E−7 | −1.11104351359765E−6 | −1.85621942149577E−6 |
| C12 | −9.59353035135498E−5 | −8.92169122302812E−5 | −8.40442906041017E−5 |
| C13 | −4.69382053536954E−6 | −4.95446511372142E−6 | −5.14171150501228E−6 |
| C14 | 4.36027790559742E−8 | 3.90325488271086E−7 | 6.89579521919427E−7 |
| C15 | 4.84553510372397E−9 | 4.15802255963233E−9 | 2.98706094704243E−9 |
| C16 | −6.70182225236622E−8 | −9.644125041583E−8 | −1.2344963465032E−7 |
| C17 | 8.53308667580782E−8 | 1.5185965638242E−7 | 2.07552157283532E−7 |
| C18 | 6.74510190437302E−7 | 4.45628062858969E−7 | 2.24999220450556E−7 |
| C19 | 4.36148115973554E−8 | −1.5915961964478E−8 | −7.50353334538695E−8 |
| C20 | −9.91702537137648E−9 | −1.16866601187391E−8 | −1.35216333785771E−8 |
| C22 | −1.38214951527391E−9 | −6.80052616320041E−10 | −4.39019706477354E−11 |
| C23 | 2.10139576071464E−9 | 6.26574901099097E−9 | 1.04560245127721E−8 |
| C24 | 5.15485193820342E−7 | 4.841611122 98266E−7 | 4.62561830576316E−7 |
| C25 | 1.7570569744129E−8 | 2.08831193021852E−8 | 2.34927128912074E−8 |
| C26 | −6.98039661590055E−10 | −1.40089344877558E−9 | −1.97390253292095E−9 |
| C30 | 1.33161803896995E−10 | 1.72023155590273E−10 | 2.06036704816715E−10 |
| C31 | −1.63746554738757E−10 | −4.53307082388049E−10 | −6.87718989129306E−10 |
| C32 | −3.95494209925138E−9 | −2.81456176662176E−9 | −1.7715214460838E−9 |
| C33 | 8.13451465215317E−12 | 9.20655481364754E−11 | 1.73683906580638E−10 |
| C39 | −3.61172174811968E−12 | −9.32029206040988E−12 | −1.49228637919166E−11 |
| C40 | −1.12283866147616E−9 | −1.06703542371861E−9 | −1.03742440051248E−9 |
| C41 | −2.24474045233862E−11 | −2.77195791801719E−11 | −3.17284435636049E−11 |
| C49 | 8.80358633091986E−14 | 4.13537860799161E−13 | 6.66324901023551E−13 |
| C50 | 5.28161039139778E−12 | 3.74382185584814E−12 | 2.38641211320932E−12 |
| C60 | 8.68709933008026E−13 | 8.37838511746401E−13 | 8.31902494298015E−13 | have a big difference, a common Zernike surface shape shown on the fourth level in FIG. 4 was used. However, since the rotationally asymmetrical aspherical shapes shown As shown on the bottommost level in FIG. 7, even when using the common conic fitting surface, it is possible to provide the contact lens 10 equipped with the lens rear surface 20 for which the difference in the optical axis direction is suppressed to about 0.1 mm in relation to the corneal surface shape within the region of −σ to +σ, thereby exhibiting the same effect as the mode noted above.

Also, with the mode noted above shown in FIG. 4, with the average (±0σ) corneal surface shape and the −σ and +σ corneal surface shapes shown on the topmost level in FIG. 4 as the subject, shape fitting of the lens rear surface 20 was performed. However, in order to cover a broader shape range, for example as shown in FIG. 8, with the corneal surface shapes of −2σ and +2σ as the subject as well, it is possible to provide the contact lens 10 after performing the same shape setting on the lens rear surface 20.

Figure 8:
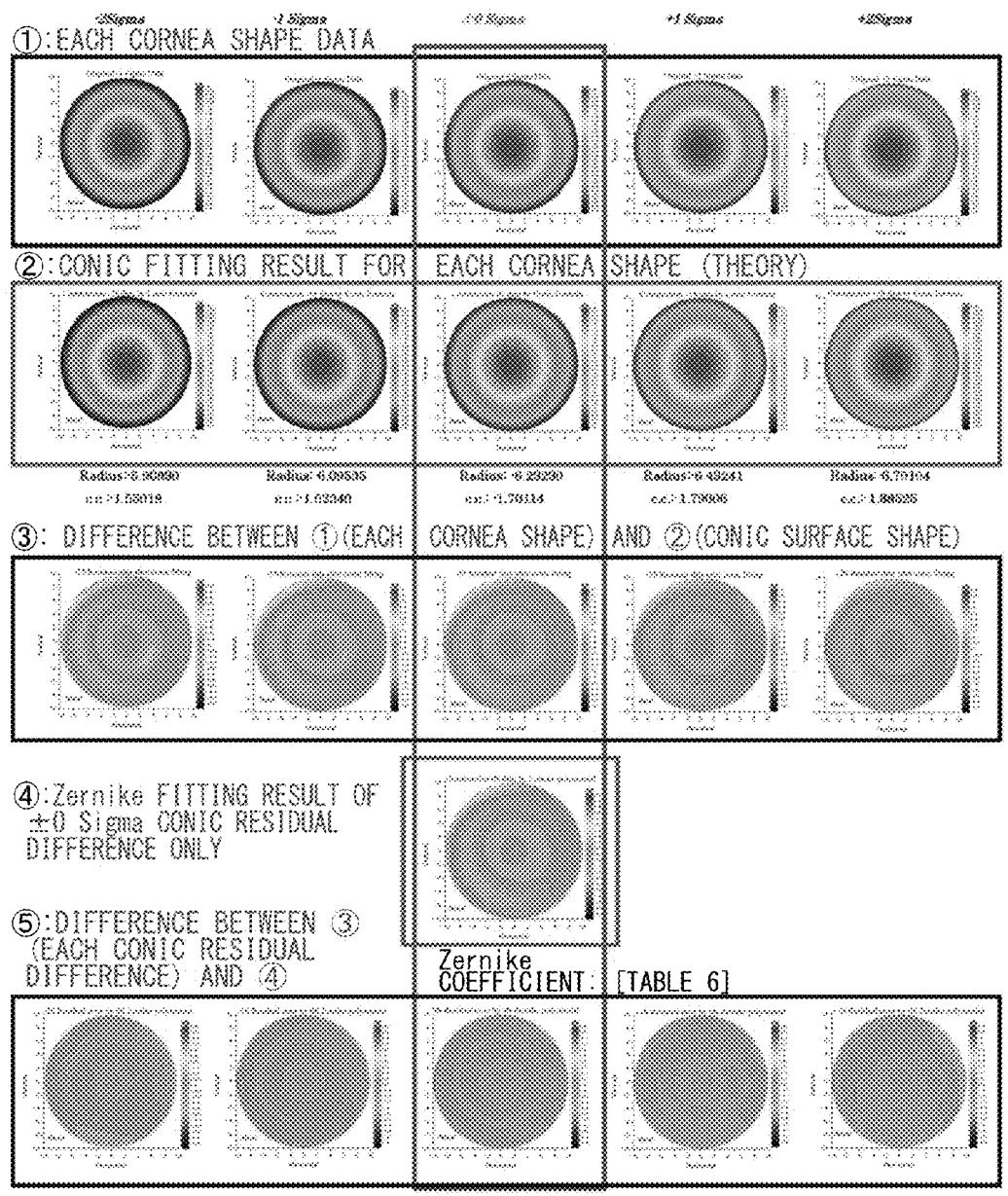
FIG. 8 is a drawing suitable for explaining color mappings showing as yet another mode of the manufacturing method of a contact lens according to the method of the present invention corneal surface shapes and each rotationally symmetrical and rotationally asymmetric definitional equation used therefor, together with the residual difference after fitting.

Specifically, on the topmost level in FIG. 8, in addition to the average (±0σ) corneal surface shape and the −σ and +σ corneal surface shapes shown in FIG. 4, the additional corneal surface shapes of −2σ and +2σ are shown by color mapping display. Also, for the corneal surface shapes of these −2σ and +2σ as well, the same conic fitting as of the mode noted above shown in FIG. 4 was performed and the rotationally symmetrical aspherical shape was defined (second level in FIG. 8), and on the remainder to which that conic surface was applied (third level in FIG. 8), the common Zernike surface (fourth level in FIG. 8) defined for the average (±0σ) corneal surface shape was fit. As the Zernike fitting results, the value of each Zernike coefficient is shown in Table 6. Furthermore, the definitional equations of the rotationally symmetrical and rotationally asymmetric aspherical shapes (conic surface and Zernike surface) were applied to each corneal surface shape, and the residual remainders are shown by color mapping display on the bottommost level in FIG. 8. We can see that it is possible to set for the contact lens 10 the lens rear surface 20 for which the difference in the optical axis direction is suppressed to about 0.1 mm in relation to any corneal surface shapes within the region of −2σ to +2σ as well.

TABLE 6

| Zernike Standard coefficient | ±0 σ coefficient value |
| --- | --- |
| C0 | −9.68450677388851E−4 |
| C1 | 8.99654244101557E−6 |
| C2 | −0.00111801543945195 |
| C3 | −1.37702826975878E−4 |
| C4 | 0.00523554095799223 |
| C5 | 3.81927075845453E−4 |
| C6 | 7.61953012550708E−6 |
| C7 | −4.43473958071473E−6 |
| C8 | 2.54602362594547E−5 |
| C9 | −3.29566791657737E−6 |
| C10 | 9.32328950340547E−7 |
| C11 | −1.11104351359765E−6 |
| C12 | −8.92169122302812E−5 |
| C13 | −4.95446511372142E−6 |
| C14 | 3.90325488271086E−7 |
| C15 | 4.15802255963233E−9 |
| C16 | −9.644125041583E−8 |
| C17 | 1.5185965638242E−7 |
| C18 | 4.45628062858969E−7 |
| C19 | −1.5915961964478E−8 |
| C20 | −1.16866601187391E−8 |
| C22 | −6.80052616320041E−10 |
| C23 | 6.26574901099097E−9 |
| C24 | 4.84161112298266E−7 |
| C25 | 2.08831193021852E−8 |
| C26 | −1.40089344877558E−9 |
| C30 | 1.72023155590273E−10 |
| C31 | −4.53307082388049E−10 |
| C32 | −2.81456176662176E−9 |
| C33 | 9.20655481364754E−11 |
| C39 | −9.32029206040988E−12 |

TABLE 6-continued

| Zernike Standard coefficient | ±0 σ coefficient value |
| --- | --- |
| C40 | −1.06703542371861E−9 |
| C41 | −2.77195791801719E−11 |
| C49 | 4.13537860799161E−13 |
| C50 | 3.74382185584814E−12 |
| C60 | 8.37838511746401E−13 |

With the mode described above, shape setting of the lens rear surface 20 was performed with the average (±0σ) corneal surface shape and the −σ and +σ corneal surface shapes, and furthermore the −2σ and +2σ corneal surface shapes as the subjects, but the statistical information of the corneal surface shapes subject to fitting is not limited to those. For example, it is also possible to perform shape design of the lens rear surface 20 for which various corneal surface shapes such as of −0.5σ and +0.5σ, −1.5σ and +1.5σ, or the like are subject to fitting instead of or in addition to those corneal surface shapes.

In light of that, as can also be understood from the results shown for each of the modes noted above within the range of −2σ to +2σ, it is possible to do fitting processing of the rotationally symmetrical element and/or the rotationally asymmetric element by sharing the conic shape or Zernike shape defined with specific cornea shape as the subject such as the average (±0σ) corneal surface shape or the like, thereby ensuring fitting precision while simplifying the calculation process.

Also, with the embodiment noted above, the step of setting the definitional equation of the rotationally symmetrical aspherical shape at step S6 and the step of setting the definitional equation of the rotationally asymmetric aspherical shape at step S7 can also be found from either definitional equation by reversing the processing sequence as long as it is possible to specify each definitional equation.

Yet further, with the modes noted above, only a specific Zernike term was used in the Zernike polynomial, but it is also possible to implement the present invention by adding another Zernike term for use, or by eliminating either Zernike term into disuse. This kind of Zernike term selection can be performed as appropriate according to, in addition to the required precision, the statistical features for the corneal surface shape of the target eyes subject to prescription, or the like. Naturally, the definitional equations of rotationally symmetrical and rotationally asymmetric aspherical shapes are not limited to the ones noted in the modes noted above, and it is possible to use as appropriate similar definitional equations which are well-known.

Furthermore, the lens inner surface shape corresponding to the corneal surface shape specified using the radius of curvature, the conic constant, and the Zernike surface can be set on at least a portion of the peripheral zone rear surface of the contact lens 10, and it is not necessary to set such inner surface shape along the entire peripheral zone rear surface. Also, it is possible to set such inner surface shape going past the peripheral zone 16, for example, up to the rear surface of the optical zone 14.

Besides, the peripheral area does not have to be set to match the peripheral zone 16 of the contact lens 10. Specifically, the peripheral area is preferably provided in the radial direction region of at least a portion of the region "between ø7 mm and a distance of 1 mm from the inside of the edge part", but in that case as well, it is acceptable to provide the peripheral area so as to go past the region "between ø7 mm and a distance of 1 mm from the inside of the edge part" to the inner circumference side or to the outer circumference side.

In addition, when setting the peripheral area comprising a rotationally asymmetric and non-toric shaped surface on the lens rear surface 20 of the peripheral zone 16 provided around the optical zone 14, it is preferable that the rotationally asymmetric and non-toric shaped surface be set in the area region of 50% or greater of that of the lens rear surface 20 of the contact lens 10.

Moreover, though not listed individually, the present invention can be implemented on modes with various changes, revision, and improvements added based on the knowledge of a person skilled in the art, and as long as those kind of embodiments do not stray from the gist of the invention, it goes without saying that they are all within the scope of the present invention.

KEYS TO SYMBOLS

10: Contact lens
14: Optical zone
16: Peripheral zone
17: Edge part
20: Lens rear surface

The invention claimed is:

1. A contact lens manufacturing method comprising:
selecting a population of target eyes having a feature that is a subject of prescription and obtaining statistical information of a corneal surface shape of the selected population of target eyes;
defining a corneal surface shape corresponding to the population of target eyes from the obtained statistical information according to Expression 1 below, which totals a mathematical expression that defines a rotationally symmetrical aspherical shape and a mathematical expression that defines a rotationally asymmetric aspherical shape;
performing a fitting of the rotationally symmetrical aspherical shape by setting values of a radius of curvature of a vertex of the corneal surface shape corresponding to the population of target eyes and a conic constant of the corneal surface shape corresponding to the population of target eyes according to Expression 2 below, and fitting a rotationally asymmetric element, which is a residual difference during the fitting of the rotationally symmetrical aspherical shape, using a Zernike polynomial shown in Expression 3 below, which specifies a Zernike surface, the Zernike polynomial including at least Zernike terms where i=1 to 20, 22 to 26, 30 to 33, 39 to 41, 49 to 50, and 60;
forming a lens rear surface shape corresponding to the set corneal surface shape only for a rear surface of a peripheral area of the contact lens; and
manufacturing a contact lens:

$$Z = \frac{\frac{x^2 + y^2}{R}}{1 + \sqrt{1 - \frac{(1 + C.C.) \cdot (x^2 + y^2)}{R^2}}} +$$ [Expression 1]

Conic Formula (rotationally symmetrical aspherical surface formula)

[Zernike Polynomial Formula]

$$R_{av} - 2\sigma_1 \leq R \leq R_{av} + 2\sigma_1$$

$$C.C._{av} - 2\sigma_2 \leq C.C. \leq C.C._{av} + 2\sigma_2$$ [Expression 2]

where,
R: Radius of curvature of the vertex of the corneal surface shape corresponding to the population of target eyes,
C.C.: Conic constant of the corneal surface shape corresponding to the population of target eyes,
$R_{av}$ and $C.C._{av}$ are average values of R and C.C., respectively,
$\sigma_1$: Standard deviation of R, and
$\sigma_2$: Standard deviation of C.C., $$W(\rho, \theta) = \sum_{i=o}^{\infty} N_i \ P_i \ Z_i$$ [Expression 3]

where,
$W(\rho, \theta)$: Zernike surface
$N_i$: i-th normalization coefficient
$P_i$: i-th standard Zernike coefficient
$Z_i$: i-th Zernike function.

2. The contact lens manufacturing method according to claim 1, wherein with the Zernike surface by which the rotationally asymmetric element in the population of the target eyes is fit, a value for fitting the rotationally asymmetric element with $\pm 0\sigma$ is used as a Zernike coefficient.

3. The contact lens manufacturing method according to claim 1, wherein the fitting of the rotationally symmetrical aspherical shape is performed using Formula 2 below:

$$Z = \frac{\frac{x^2 + y^2}{R}}{1 + \sqrt{1 - \frac{(1 + C.C.) \cdot (x^2 + y^2)}{R^2}}}$$ [Formula 2]

where,
R: Radius of curvature of a vertex
C.C.: Conic constant.

4. The contact lens manufacturing method according to claim 1, wherein the feature that is the subject of prescription with the target eyes is myopia.

5. The contact lens manufacturing method according to claim 4, wherein the value of the radius of curvature and the value of the conic constant are set within a range of a formula below, and as the Zernike polynomial for specifying the Zernike surface, an item is used that contains terms of the following standard Zernike coefficient values:

−5.909 mm≤R≤−6.701 mm
−1.550≤C.C.≤−1.885
$P_0 = -9.6845 \times 10^{-4}$
$P_1 = 8.9965 \times 10^{-6}$
$P_2 = -0.0011180$
$P_3 = -1.3770 \times 10^{-4}$
$P_4 = 0.0052355$
$P_5 = 3.8193 \times 10^{-4}$
$P_6 = 7.6195 \times 10^{-6}$
$P_7 = -4.4347 \times 10^{-6}$
$P_8 = 2.5460 \times 10^{-5}$
$P_9 = -3.2957 \times 10^{-6}$
$P_{10} = 9.3233 \times 10^{-7}$
$P_{11} = -1.1110 \times 10^{-6}$
$P_{12} = -8.9217 \times 10^{-5}$
$P_{13} = -4.9545 \times 10^{-6}$
$P_{14} = 3.9033 \times 10^{-7}$
$P_{15} = 4.1580 \times 10^{-9}$
$P_{16} = -9.6441 \times 10^{-8}$
$P_{17} = 1.5186 \times 10^{-7}$ $P_{18}=4.4563\times10^{-7}$
$P_{19}=-1.5916\times10^{-8}$
$P_{20}=-1.1687\times10^{-8}$
$P_{22}=-6.8005\times10^{-10}$
$P_{23}=6.2657\times10^{-9}$
$P_{24}=4.8416\times10^{-7}$
$P_{25}=2.0883\times10^{-8}$
$P_{26}=-1.4009\times10^{-9}$
$P_{30}=1.7202\times10^{10}$
$P_{31}=-4.5331\times10^{-10}$
$P_{32}=-2.8146\times10^{-9}$
$P_{33}=9.2066\times10^{11}$
$P_{39}=-9.3203\times10^{-12}$
$P_{40}=-1.0670\times10^{-9}$
$P_{41}=-2.7720\times10^{-11}$
$P_{49}=4.1354\times10^{-13}$
$P_{50}=3.7438\times10^{-12}$
$P_{60}=8.3784\times10^{-13}$.

6. The contact lens manufacturing method according to claim 1, wherein the contact lens is a hard type contact lens.

7. The contact lens manufacturing method according to claim 1, wherein within a region of the contact lens further to an outer circumference side than 07 mm and further to an inner circumference side than 1 mm from an inside of an edge part, the peripheral area is provided using the lens rear surface shape corresponding to the corneal surface shape specified by the radius of curvature, the conic constant, and the Zernike surface.

8. The contact lens manufacturing method according to claim 1, wherein
the contact lens comprises an optical zone and a peripheral zone that surrounds an outer circumference of the optical zone,
the peripheral zone includes the peripheral area that uses the lens rear surface shape corresponding to the corneal surface shape specified by the radius of curvature, the conic constant, and the Zernike surface, and
the optical zone is configured to form a clearance between the optical zone and a cornea to be filled with lacrimal fluid.

* * * * *